United States Patent
Kang et al.

(10) Patent No.: US 7,631,322 B2
(45) Date of Patent: Dec. 8, 2009

(54) MAGNETIC CIRCUIT, OPTICAL PICKUP ACTUATOR, OPTICAL RECORDING AND/OR REPRODUCING APPARATUS, AND METHODS THEREFOR

(75) Inventors: Hyung-joo Kang, Seoul (KR); Byung-youn Song, Suwon-si (KR); Pyong-yong Seong, Seoul (KR); Dae-jong Jang, Ayang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 798 days.

(21) Appl. No.: 11/043,453

(22) Filed: Jan. 27, 2005

(65) Prior Publication Data

US 2005/0185532 A1 Aug. 25, 2005

(30) Foreign Application Priority Data

Jan. 27, 2004 (KR) .................. 10-2004-0004997

(51) Int. Cl.
*G11B 7/00* (2006.01)
(52) U.S. Cl. .................. 720/683; 720/681; 720/672
(58) Field of Classification Search ......... 720/672–675, 720/682–685; 369/44.17, 44.22
See application file for complete search history.

(56) References Cited

U.S. PATENT DOCUMENTS

| | | | | |
|---|---|---|---|---|
| 7,006,307 | B2* | 2/2006 | Jang et al. | 359/814 |
| 2003/0128443 | A1* | 7/2003 | Jang et al. | 359/824 |
| 2004/0148620 | A1* | 7/2004 | Jang et al. | 720/683 |
| 2006/0056081 | A1* | 3/2006 | Jang et al. | 359/814 |

FOREIGN PATENT DOCUMENTS

| | | |
|---|---|---|
| EP | 1355301 | 10/2003 |
| EP | 1369854 | 12/2003 |
| JP | 11-296884 | 10/1999 |
| JP | 2000-20983 | 1/2000 |
| JP | 2000-353329 | 12/2000 |
| JP | 2001-325739 | 11/2001 |
| JP | 2003-203373 | 7/2003 |
| KR | 1998-83599 | 12/1998 |
| KR | 2001-109836 | 12/2001 |

OTHER PUBLICATIONS

Japanese Office Action Issued Jul. 11, 2006 in Related Japanese Application No. 2005-20358.
European Patent Search Report dated Nov. 3, 2006 and issued in correspondence to International Application No. 05250431.3-2210.

* cited by examiner

*Primary Examiner*—Andrea L Wellington
*Assistant Examiner*—Carlos E Garcia
(74) *Attorney, Agent, or Firm*—Staas & Halsey LLP

(57) ABSTRACT

A magnetic circuit, an optical pickup actuator, an optical recording and/or reproducing apparatus using the magnetic circuit, and method of the same, wherein the magnetic circuit includes a plurality of focus coil units each of which includes a first focus coil and a second focus coil, and a magnet including a plurality of magnet portions which interact with the plurality of focus coil units and each of which is polarized in a direction opposite to adjacent magnet portions thereamong. Here, electromagnetic forces act on the first and second focus coils in each focus coil unit in a same direction in response to focus driving signals and in opposite directions in response to tilt driving signals, with the first and second focus coils in each focus coil unit have different effective coil lengths.

39 Claims, 9 Drawing Sheets

MAGNETIC CIRCUIT, OPTICAL PICKUP ACTUATOR, OPTICAL RECORDING AND/OR REPRODUCING APPARATUS, AND METHODS THEREFOR

CROSS-REFERENCE TO RELATED APPLICATIONS

This application claims the benefit of Korean Patent Application No. 10-2004-0004997, filed on Jan. 27, 2004, in the Korean Intellectual Property Office, the disclosure of which is incorporated herein by reference.

BACKGROUND OF THE INVENTION

1. Field of the Invention

Embodiments of the present invention relate to an optical recording and/or reproducing apparatus and methods thereof, and more particularly, to a magnetic circuit/method using a plurality of focus coils for both focus driving and tilt driving, and an optical pickup actuator, an optical recording and/or reproducing apparatus, and methods therefore.

2. Description of the Related Art

Generally, an optical pickup is used for an optical recording and/or reproducing apparatus. The optical pickup moves over an optical information storage medium, e.g., an optical disk in a radial direction of the optical disk, and records/reproduces information onto and/or from the optical information storage medium in a non-contacting way.

The optical pickup uses an optical pickup actuator to drive an objective lens in a tracking direction, a focus direction, and/or a tilt direction to ensure light emitted from a light source forms a light spot at a correct position on the optical information storage medium. Driving in the tracking direction means adjusting the objective lens in the radial direction of the optical disk, for example, so that the light spot is formed along a center of a track.

Generally, optical pickup actuators include a lens holder movably installed at a base, a suspension supporting the lens holder to move with respect to the base, and a magnetic circuit installed facing the lens holder and the base. Such optical pickup actuators move in tracking and focus directions. With this in mind, it is noted that related optical recording and/or reproducing apparatuses are now tending to operate at high densities, with compact sizes and light weights.

To accommodate these high densities, the corresponding optical pickup actuator also needs to move in a tilt direction, in addition to the tracking and focus directions. In other words, to accommodate the high densities, the numerical aperture of the corresponding objective lens is increased and the wavelength of the respective light source is decreased. As a result, a tilt margin of the optical pickup actuator can be decreased. Thus, it is desirable for the optical pickup actuator to also move in the tilt direction, in addition to the tracking and focus directions.

In addition, to accommodate the high speeds of these optical recording and/or reproducing apparatuses, a more highly sensitive optical pickup actuator is further desired. The magnetic circuit used to obtain such a highly sensitive optical pickup actuator uses a pair of focus coils to achieve high focus sensitivity. When such a magnetic circuit is used, radial tilt driving is performed in a differential mode, where tilt driving signals having opposite phases are applied to the pair of focus coils, respectively. The differential mode thus has an advantage of high tilt sensitivity.

FIG. 1 illustrates an example of such a conventional magnetic circuit used in a conventional optical pickup actuator. This conventional magnetic circuit includes a four-pole magnet 1 having N and S-poles appropriately distributed among quadrants, first and second focus coils 3 and 5, and first and second track coils 7 and 9.

The first and second focus coils 3 and 5 and the first and second track coils 7 and 9 are installed on a side of a moving part, i.e., a lens holder, of the optical pickup actuator. The four-pole magnet 1 is installed at a base to face the focus and track coils 3, 5, 7, and 9.

As shown in FIG. 1, first through fourth magnet portions $1a$, $1b$, $1c$, and $1d$ of the magnet 1 respectively corresponding to first through fourth quadrants on a y-z coordinate plane, correspond to a north pole (N-pole), a south pole (S-pole), an N-pole, and an S-pole, respectively. The first and second focus coils 3 and 5 are disposed such that the first focus coil 3 interacts with the first and fourth magnet portions $1a$ and $1d$ and the second focus coil 5 interacts with the second and third magnet portions $1b$ and $1c$. The first and second track coils 7 and 9 are disposed such that the first track coil 7 interacts with the first and second magnet portions $1a$ and $1b$ and the second track coil 9 interacts with the third and fourth magnet portions $1c$ and $1d$.

In FIG. 1, hatched areas illustrate effective coil portions. In other words, hatched areas in the first and second focus coils 3 and 5 are effective focus coil portions, and hatched areas in the first and second track coils 7 and 9 are effective track coil portions.

When the above-described conventional magnetic circuit is used, a moving part of an optical pickup actuator can be driven in the focus and tracking directions and can also be driven in the tilt direction using the aforementioned differential mode.

Referring to FIG. 2A, when current flows in the first and second focus coils 3 and 5 clockwise and counterclockwise, respectively, forces act on the first and second focus coils 3 and 5 in a positive (+) focus direction (i.e., in a +z-direction). When the directions of the current flows in the respective first and second focus coils 3 and 5 are reversed, forces act on the first and second focus coils 3 and 5 in a negative (−) focus direction (i.e., in a −z-direction). Accordingly, the conventional magnetic circuit can drive an objective lens, installed in a moving part of an optical pickup actuator, in a focus direction. For focus driving, a pair of focus driving signals, for respective focus coils, having the same phase are used. Current flows in the first and second focus coils 3 and 5 in opposite directions, respectively, because the first and second focus coils 3 and 5 are typically wound in opposite directions, respectively.

When sizes of the forces respectively acting on the first and second focus coils 3 and 5, in the focus direction during the focus driving, are represented by "FA" and "FB", respectively, the focus thrust acting during the focus driving becomes the sum of FA and FB, i.e., FA+FB.

Referring to FIG. 2B, when current is applied to the first and second focus coils 3 and 5 in the same direction (e.g., counterclockwise), a force acts on the first focus coil 3 in, for example, the negative focus direction (i.e., the −z-direction) and a force acts on the second focus coil 5 in, for example, the positive focus direction (i.e., the +z-direction). When the direction of the current applied to the first and second focus coils 3 and 5 is reversed, directions of the forces respectively acting on the first and second focus coils 3 and 5 are also reversed. Accordingly, a moving part of an optical pickup actuator can be driven in the tilt direction, e.g., in a radial tilt direction, such that a tilt of an objective lens installed at the moving part can be adjusted.

When sizes of the forces respectively acting on the first and second focus coils 3 and 5, in the focus direction while a tilt driving signal is applied, are represented by "FA'" and "FB'", respectively, the resultant torque during tilt driving becomes R(FA'+FB'). Since the first and second focus coils 3 and 5 are used for both of the focus driving and the tilt driving, FA'=FA and FB'=FB when a magnitude of the focus driving signal is the same as that of the tilt driving signal. Here, "R" represents a distance between a central C of rotation and a central of the force acting on either of the first and second focus coils 3 and 5.

As seen from FIGS. 2A and 2B, the conventional magnetic circuit can perform the tilt driving in the differential mode using the pair of the first and second focus coils 3 and 5.

Meanwhile, when current flows in the first and second track coils 7 and 9 clockwise and counterclockwise, respectively, forces act on the first and second track coils 7 and 9 in the left direction (i.e., in a −y-direction). When the directions of the current flows in the respective first and second track coils 7 and 9 are reversed, the respective forces act on the first and second track coils 7 and 9 in the right direction (i.e., in a +y-direction).

As described above, an optical pickup actuator using the conventional magnetic circuit can drive an objective lens, installed in a moving part of the optical pickup actuator, in the focus direction. In addition, the moving part can also be driven in the tilt direction, e.g., in the radial tilt direction. Accordingly, a tilt of the objective lens installed at the moving part can be adjusted. Moreover, the moving part of the optical pickup actuator can be driven in the tracking direction so that the objective lens can be controlled to correctly follow a track. Therefore, when a pair of such conventional magnetic circuits are installed along opposite sides, respectively, of the moving part of the optical pickup actuator, the objective lens can be driven in focus directions, tracking directions, and radial tilt directions.

However, as focus sensitivity increases in the conventional magnetic circuit, tilt sensitivity also increases, which causes problems. In detail, usually in the aforementioned differential mode, the same circuit is used for both of focus control and tilt control. A pair of focus driving signals input to the circuit for the focus control have the same phase, while a pair of tilt driving signals input to the circuit for the tilt control have opposite phases, respectively. When the same circuit is used for both of the focus control and the tilt control, as described above, even when only a focus driving signal is input to the circuit with a tilt driving signal being set to zero, the tilt driving signal actually doesn't have a value of zero but has a predetermined value, e.g., a value of ±25 mV. In this situation, if the tilt sensitivity is extremely high, the tilt driving may unintentionally be provoked.

Accordingly, when the conventional magnetic circuit, which increases the tilt sensitivity when the focus sensitivity is increased, is used, undesired tilt driving may be performed while the tilt driving is not required. To solve this problem a reduction in the tilt sensitivity has been recommended. However, if the tilt sensitivity is reduced by, for example, decreasing the number of winds of the first and second focus coils 3 and 5, the focus sensitivity is also reduced. Consequently, reducing of the tilt sensitivity by decreasing the number of winds of the first and second focus coils 3 and 5 cannot be an appropriate solution.

SUMMARY OF THE INVENTION

Embodiments of the present invention provide for a magnetic circuit that uses a focus coil for both of focus driving and tilt driving while preventing unnecessary tilt driving, without reducing focus sensitivity, and corresponding optical pickup actuators, optical recording and/or reproducing apparatuses that use such a magnetic circuit, and corresponding methods.

Additional aspects and/or advantages of the invention will be set forth in part in the description which follows and, in part, will be obvious from the description, or may be learned by practice of the invention.

To achieve the above and/or additional aspects and advantages, embodiments of the present invention set forth a magnetic circuit, including a plurality of focus coil units, and a magnet having a plurality of magnet portions to interact with the plurality of focus coil units, each magnet portion being polarized in a direction opposite to an adjacent magnet portion, of the plurality of magnet portions, wherein electromagnetic forces act on at least two focus coils, of at least one of the plurality of focus coil units, in respectively same directions in response to focus driving signals and in respectively opposite directions in response to tilt driving signals, and wherein the at least two focus coils have different effective coil lengths.

Each of the plurality of focus coil units may include a first focus coil unit, having at least two focus coils; and a second focus coil unit, having at least two focus coils. Further, an effective overall coil length in the at least two focus coils of the first focus coil unit may be the same as an effective overall coil length in the at least two focus coils of the second focus coil unit. Similarly, an effective coil length of a first focus coil of the first focus coil unit may be a same as an effective coil length of a second focus coil of the second focus coil unit, and an effective coil length of a second focus coil of the first focus coil unit may be a same as an effective coil length of a first focus coil of the second focus coil unit.

A focus coil of the first focus coil unit, having a longer effective coil length than another focus coil of the first focus coil unit, may be connected with a focus coil of the second focus coil unit, having a shorter effective coil length than another focus coil of the second focus coil unit. In addition, the plurality of magnet portions may further including at least four magnet portions, having a first magnet portion and a second magnet portion polarized in opposite directions to interact with the first focus coil unit, and a third magnet portion and a fourth magnet portion polarized in opposite directions to interact with the second focus coil unit.

The plurality of focus coil units may further include a first focus coil unit and a second focus coil unit disposed in a focus direction, and a third focus coil unit and a fourth focus coil unit disposed in the focus direction and separated from the first and second focus coil units in a tracking direction. A focus coil of the first focus coil unit, having a longer effective coil length than another focus coil of the first focus coil unit, may be connected with a focus coil of the second focus coil unit, having a longer effective coil length than another focus coil in the second focus coil unit, and the other focus coil of the first focus coil unit may be connected with the other focus coil of the second focus coil unit, and a focus coil of the third focus coil unit, having a longer effective coil length than another focus coil of the third focus coil unit, may be connected with a focus coil of the fourth coil unit, having a longer effective coil length than another focus coil of the fourth focus coil unit, and the other focus coil of the third focus coil unit may be connected with the other focus coil of the fourth focus coil unit.

Similarly, the focus coil of the first focus coil unit may be connected with the other focus coil of the third focus coil unit and the other focus coil unit of the second focus coil unit may be connected with the focus coil of the fourth focus coil unit.

Likewise, a first focus coil and a second focus coil, of the at least two focus coils, may have a same entire effective coil length, throughout the plurality of focus coil units.

In addition, the magnetic circuit may include at least one track coil disposed to interact with the magnet and used for tracking driving.

To achieve the above and/or additional aspects and advantages, embodiments of the present invention set forth an optical pickup actuator including a lens holder mounted with an objective lens, a support member, with one end of the support member being fixed to a side of the lens holder and another end of the support member being fixed to a holder provided on one end portion of a base to enable the lens holder to move with respect to the base, and a pair of magnetic circuits disposed on opposite sides of the lens holder, wherein each of the magnetic circuits may include a plurality of focus coil units, and a magnet having a plurality of magnet portions to interact with the plurality of focus coil units, each magnet portion being polarized in a direction opposite to an adjacent magnet portion, of the plurality of magnet portions, wherein electromagnetic forces act on at least two focus coils, of at least one of the plurality of the focus coil units, in respectively same directions in response to focus driving signals and in respectively opposite directions in response to tilt driving signals, and wherein the at least two first and second focus coils have different effective coil lengths.

Similarly to above, each of the plurality of focus coil units may include a first focus coil unit, having at least two focus coils, and a second focus coil unit, having at least two focus coils. In addition, an effective overall coil length in the at least two focus coils of the first focus coil unit may be the same as an effective overall coil length in the at least two focus coils of the second focus coil unit. An effective coil length of a first focus coil of the first focus coil unit may also be a same as an effective coil length of a second focus coil of the second focus coil unit, and an effective coil length of a second focus coil of the first focus coil unit may be a same as an effective coil length of a first focus coil of the second focus coil unit.

A focus coil of the first focus coil unit, having a longer effective coil length than another focus coil of the first focus coil unit, may connected with a focus coil of the second focus coil unit, having a shorter effective coil length than another focus coil of the second focus coil unit. The plurality of magnet portions may further include at least four magnet portions, including a first magnet portion and a second magnet portion polarized in opposite directions to interact with the first focus coil unit, and a third magnet portion and a fourth magnet portion polarized in opposite directions to interact with the second focus coil unit.

Similar to above, a focus coil of the first focus coil unit, having a longer effective coil length than another focus coil of the first focus coil unit, may be connected with a focus coil of the second focus coil unit, having a longer effective coil length than another focus coil in the second focus coil unit, and the other focus coil of the first focus coil unit may be connected with the other focus coil of the second focus coil unit, and wherein a focus coil of the third focus coil unit, having a longer effective coil length than another focus coil of the third focus coil unit, may be connected with a focus coil of the fourth coil unit, having a longer effective coil length than another focus coil of the fourth focus coil unit, and the other focus coil of the third focus coil unit may be connected with the other focus coil of the fourth focus coil unit. In addition, the focus coil of the first focus coil unit may also be connected with the other focus coil of the third focus coil unit and the other focus coil unit of the second focus coil unit may be connected with the focus coil of the fourth focus coil unit.

To achieve the above and/or additional aspects and advantages, embodiments of the present invention set forth an optical recording and/or reproducing apparatus including an optical pickup having an actuator driving an objective lens, the optical pickup moving in a radial direction of a medium and recording and/or reproducing information into and/or from the medium, and a control unit controlling a focus servo and a track servo of the optical pickup, wherein the actuator includes a lens holder mounted with an objective lens, a support member, with one end of the support member being fixed to a side of the lens holder and another end of the support member being fixed to a holder provided on one end portion of a base to enable the lens holder to move with respect to the base, and a pair of magnetic circuits disposed on opposite sides of the lens holder, wherein each of the magnetic circuits includes a plurality of focus coil units, and a magnet having a plurality of magnet portions to interact with the plurality of focus coil units, each magnetic portion being polarized in a direction opposite to an adjacent magnet portions, of the plurality of magnet portions, wherein electromagnetic forces act on at least two focus coils, of at least one of the plurality of focus coil units, in respectively same directions in response to focus driving signals and in respectively opposite directions in response to tilt driving signals, and wherein the at least two focus coils have different effective coil lengths.

Similar to above, each of the plurality of focus coil units may include a first focus coil unit, having at least two focus coils, and a second focus coil unit, having at least two focus coils. An effective overall coil length in the at least two focus coils of the first focus coil unit may be the same as an effective overall coil length in the at least two focus coils of the second focus coil unit. Similarly, an effective coil length of a first focus coil of the first focus coil unit may be a same as an effective coil length of a second focus coil of the second focus coil unit, and an effective coil length of a second focus coil of the first focus coil unit may be a same as an effective coil length of a first focus coil of the second focus coil unit. In addition, a focus coil of the first focus coil unit, having a longer effective coil length than another focus coil of the first focus coil unit, may be connected with a focus coil of the second focus coil unit, having a shorter effective coil length than another focus coil of the second focus coil unit.

The plurality of focus coil units may further include a first focus coil unit and a second focus coil unit disposed in a focus direction, and a third focus coil unit and a fourth focus coil unit disposed in the focus direction and separated from the first and second focus coil units in a tracking direction. A focus coil of the first focus coil unit, having a longer effective coil length than another focus coil of the first focus coil unit, may be connected with a focus coil of the second focus coil unit, having a longer effective coil length than another focus coil of the second focus coil unit, and the other focus coil of the first focus coil unit, may be connected with the other focus coil of the second coil unit, and a focus coil of the third focus coil unit, having a longer effective coil length than another focus coil of the third focus coil unit, may be connected with a focus coil of the fourth coil unit, having a longer effective coil length than another focus coil of the fourth focus coil unit, and the other focus coil of the third of the third focus coil unit may be connected with the other focus coil of the fourth focus coil unit. The focus coil of the first focus coil unit may also be connected with the other focus coil of the third focus coil unit and the other focus coil unit of the second focus coil unit may be connected with the focus coil of the fourth focus coil unit.

To achieve the above and/or additional aspects and advantages, embodiments of the present invention set forth a method of controlling a magnetic circuit, including forcing a plurality of magnet portions of a magnet to interact with a plurality of focus coil units, each magnet portion being polarized in a direction opposite to an adjacent magnet portion, of the plurality of magnet portions, wherein electromagnetic forces act on at least two focus coils, of at least one of the plurality of focus coil units, in respectively same directions in response to focus driving signals and in respectively opposite directions in response to tilt driving signals, and wherein the at least two focus coils have different effective coil lengths.

To achieve the above and/or additional aspects and advantages, embodiments of the present invention set forth an optical pickup actuating method, including moving a lens holder, mounted with an objective lens, with respect to a base, through a support member, with one end of the support member being fixed to a side of the lens holder and another end of the support member being fixed to a holder provided on one end portion of the base, wherein the moving of the lens holder is performed using a magnetic circuit controlled according embodiments of the present invention.

To achieve the above and/or additional aspects and advantages, embodiments of the present invention set forth an optical recording and/or reproducing method, including driving an actuator, of an optical pickup, in a radial direction of a medium, a control unit controlling the driving of the actuator to control a focus, track, and/or tilt servo of the optical pickup, and recording and/or reproducing information into and/or from the medium, wherein the driving of the actuator is performed using a magnetic circuit controlled according to embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
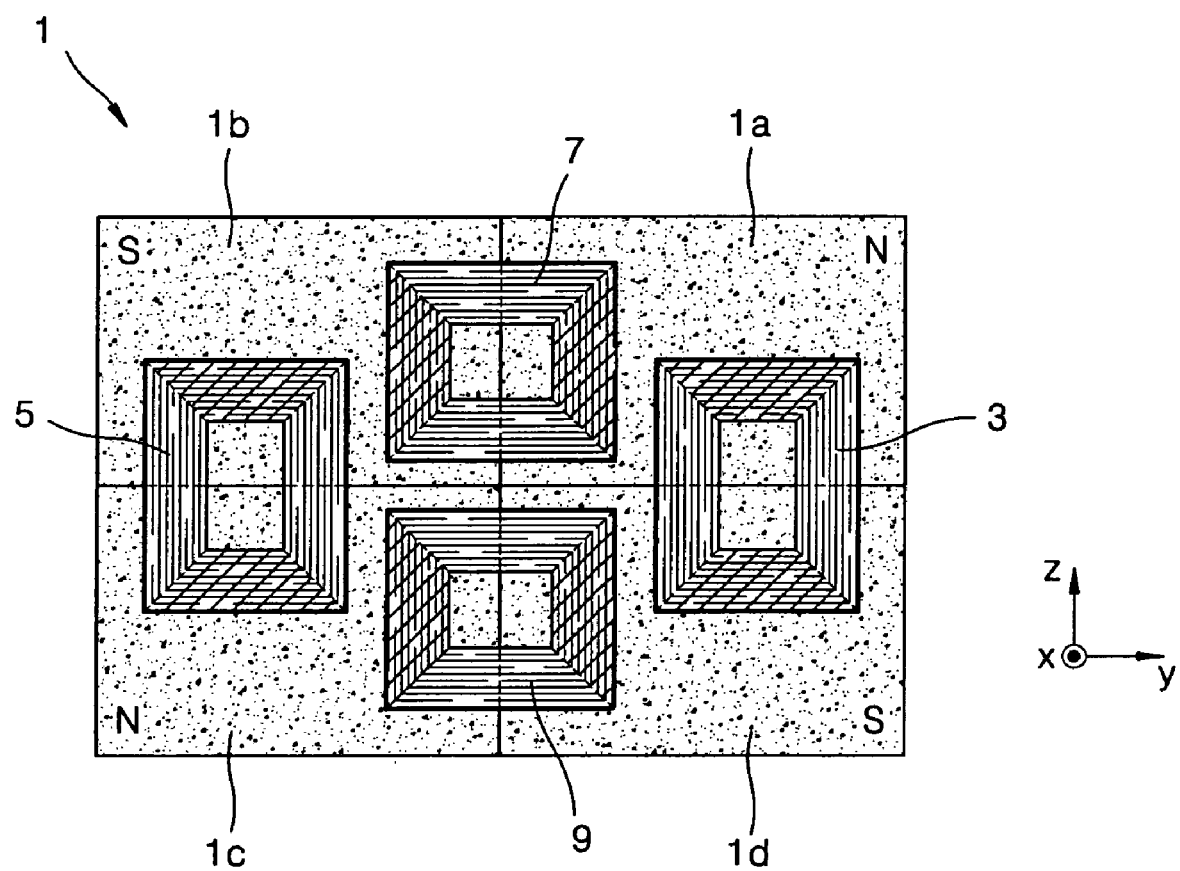
FIG. 1 illustrates a conventional magnetic circuit used in a conventional optical pickup actuator.

Reference will now be made in detail to embodiments of the present invention, examples of which are illustrated in the accompanying drawings, wherein like reference numerals refer to the like elements throughout. The embodiments are described below to explain the present invention by referring to the figures.

The relative amount of tilt of an objective lens, installed at a moving part of an optical pickup actuator, with respect to an optical information storage medium is actually not very large. Accordingly, tilt driving is usually performed within a small range of less than several degrees.

In addition, a voltage of, for example, ±5 V may be applied to a circuit to implement focus servo, tracking servo, and tilt servo. Accordingly, compared to tilt driving performed with tilt sensitivity given such that the tilt is changed by 1 degree when a voltage of several mV is applied, the same driving result can be obtained by decreasing the tilt sensitivity and increasing a tilt driving voltage range. Thus, it is satisfactory when the tilt sensitivity is decreased such that the tilt is changed by 1-3 degrees with 1 V, for example.

Accordingly, to overcome the conventional problem of unnecessary tilt driving occurring due to extremely high tilt sensitivity when focus sensitivity is increased, embodiments of the present invention provide for a magnetic circuit that decreases the tilt sensitivity, such that the conventional problem of unnecessary tilt driving is prevented, without decreasing the focus sensitivity. When a magnetic circuit according to embodiments of the present invention is used, the tilt range can be widened by increasing a range of a tilt driving signal.

A magnetic circuit, according to an embodiment of the present invention, can include a plurality of focus coil units, each of which includes a first focus coil and a second focus coil, and a magnet that has a polarization structure corresponding to the focus coil units. The first and second focus coils are provided in each of the focus coil units such that electromagnetic forces act on the first and second focus coils in the same direction in response to a focus driving signal and in opposite directions in response to a tilt driving signal. The first and second focus coils provided in each of the focus coil units may also have different effective coil lengths, respectively.

Hereinafter, in the described embodiments of the present invention, a magnetic circuit may include two focus coil units and a magnet having four magnet portions. In other embodiments of the present invention, a magnetic circuit may further include at least a pair of the focus coil units, e.g., four focus coil units, and a magnet having a polarization structure to interact with the focus coil units.

Figure 3:
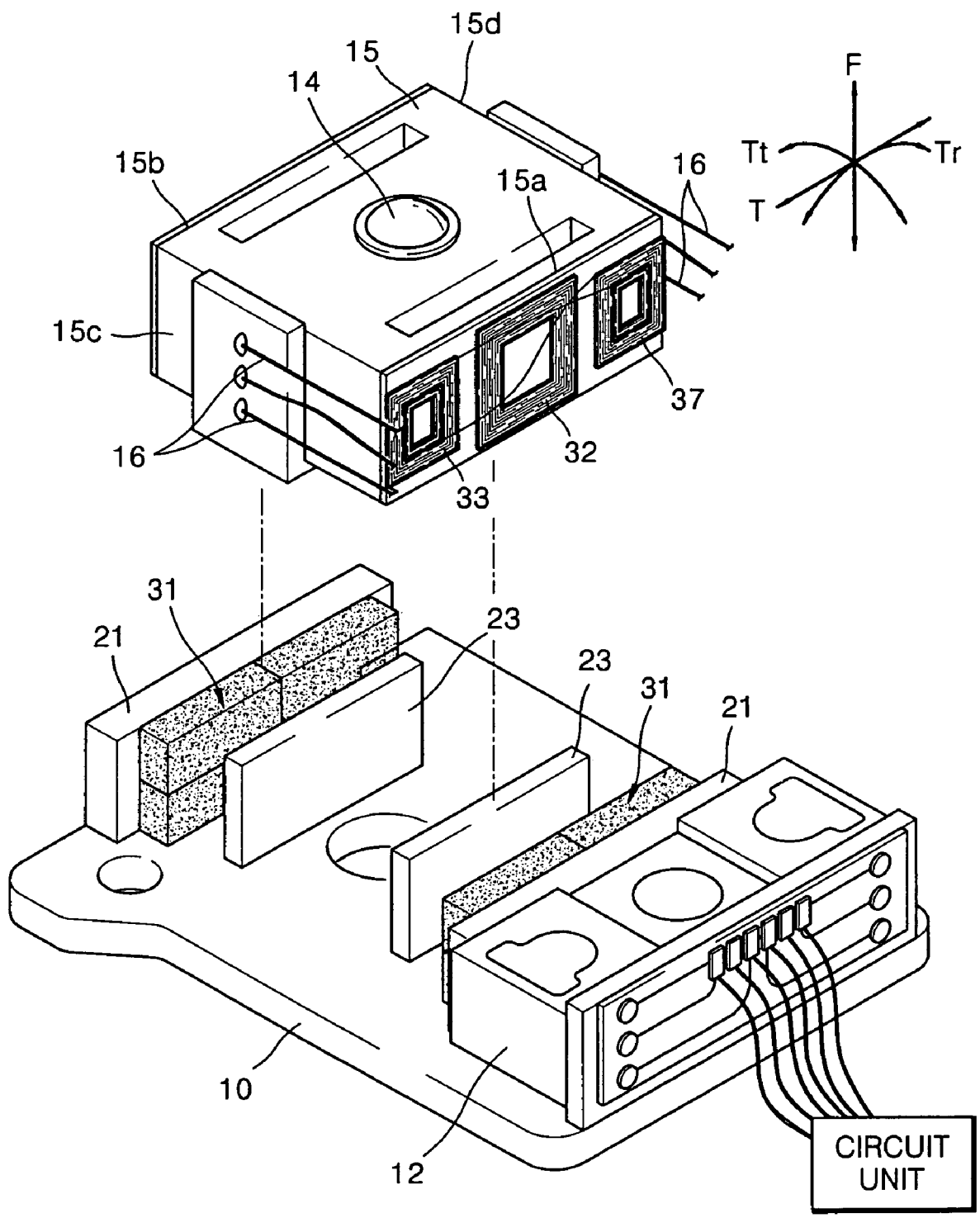
FIG. 3 is a schematic partial and exploded perspective view of an optical pickup actuator using a magnetic circuit, according to an embodiment of the present invention.

FIG. 3 is a schematic perspective view of an optical pickup actuator using a magnetic circuit, according to an embodiment of the present invention. In FIG. 3, F denotes a focus direction, T denotes a tracking direction (corresponding to a radial direction of a disk type optical information storage medium), Tr denotes a radial tilt direction, and Tt denotes a tangential tilt direction.

Referring to FIG. 3, the optical pickup actuator includes a lens holder 15, a plurality of support members 16, and a pair of magnetic circuits. The lens holder 15 can be movably installed at a base 10 and mounted with an objective lens 14. An end of the support member 16 is fixed at a side 15c or 15d of the lens holder 15 and the other end of the support member 16 is fixed at a holder 12 provided along an end portion on the base 10, such that the lens holder 15 can move with respect to the base 10. Each of the magnetic circuits is disposed on either of opposite sides 15a and 15b of the lens holder 15 and on the base 10 in a facing pattern.

In addition, the optical pickup actuator may further include an outer yoke 21 on which a magnet 31 included in the magnetic circuit is stationed and an inner yoke 23, corresponding to the outer yoke 21, to guide magnetic flux induced by the magnet 31. Alternatively, the optical pickup actuator may include only one of the outer yoke 21 and the inner yoke 23.

The plurality of support members 16 may be fixed at the sides 15c and 15d of the lens holder 15, compared to sides 15a and 15b on which the magnetic circuits are disposed, and may be implemented by wires or plate springs. As illustrated in FIG. 3, in an embodiment of the present invention, the plurality of support member 16 of the optical pickup actuator may include six wires. Alternately, only four wires of the six wires may be used as the support members 16, for example.

When coils of the magnetic circuits are disposed on sides of the lens holder 15, the number of wires provided in the optical pickup actuator, according to an embodiment of the present invention, changes according to what type of driving the optical pickup actuator is to be used for among a two-axial type, a three-axial type, and a four-axial type, for example.

In an optical pickup actuator, according to an embodiment of the present invention, the two-axial type may correspond to driving in the focus direction and the tilt direction or driving in the focus direction and the tracking direction. The three-axial type may correspond to driving in the focus direction, the tracking direction, and the radial tilt direction. As a further example, the four-axial type may correspond to driving in the focus direction, the tracking direction, the radial tilt direction, and the tangential tilt direction.

Recently, to achieve high densities, the numerical aperture of the objective lens has been increased, and the wavelength of the corresponding light source has been decreased. As a result, a tilt margin of an optical pickup actuator is decreased, and therefore, a three- or four-axial type optical pickup actuator driven in the tilt direction, in addition to the focus and tracking directions, is required. An axial type for driving an optical pickup actuator depends on a structure of a magnetic circuit.

Alternatively, the illustrated magnet 31 of the magnetic circuit, according to another embodiment of the present invention, may be disposed on one side of the lens holder 15, and coils of the magnetic circuit may be disposed on the base 10 to face the magnet 31. In this case, the number of support members 16 may be set regardless of the axial type for driving the optical pickup actuator.

In embodiments of the present invention, a pair of magnetic circuits can be provided in an optical pickup actuator. Each magnetic circuit includes a plurality of focus coils used for both of focus driving and tilt driving and has a structure which allows for the tilt driving to be performed in a differential mode and achieves tilt sensitivity in which unnecessary tilt driving does not occur during high-sensitivity focus driving.

Hereinafter, exemplary embodiments of a magnetic circuit according to an embodiment of the present invention will be described in detail.

Figure 4:
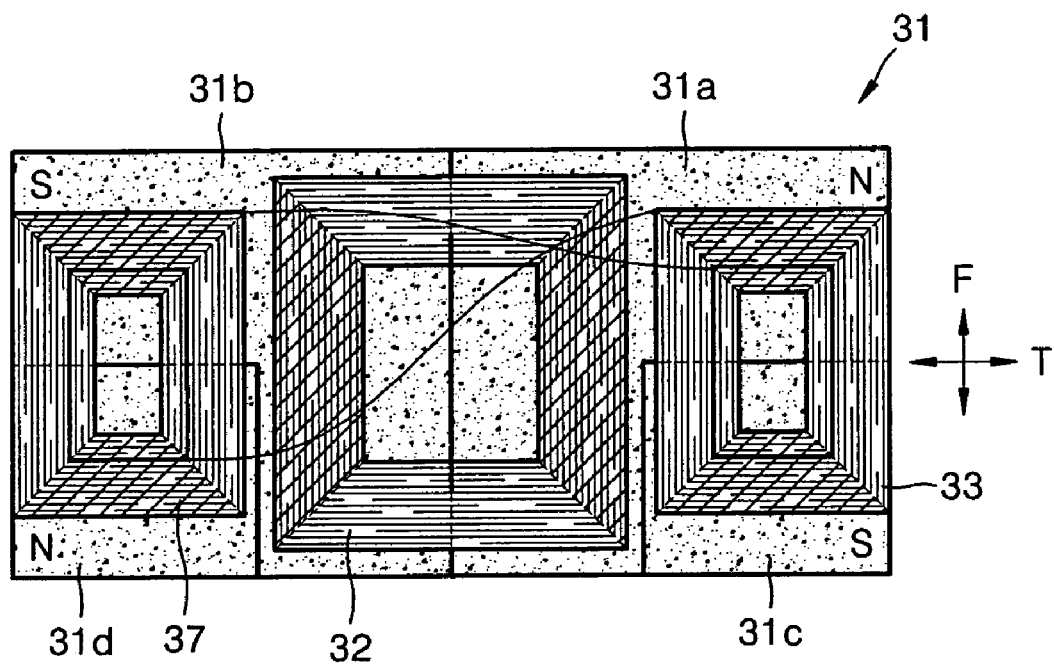
FIG. 4 is a schematic diagram of a magnetic circuit, according to an embodiment of the present invention.

FIG. 4 is a schematic diagram of a magnetic circuit, according to an embodiment of the present invention, noting that the optical pickup actuator shown in FIG. 3 can use the magnetic circuit shown in FIG. 4.

Referring to FIG. 4, the magnetic circuit includes the magnet 31 and first and second focus coil units 33 and 37 for driving the lens holder 15 in the focus direction, as well as for tilt driving. The magnetic circuit may further include a track coil 32 to drive the lens holder 15 in the tracking direction.

The magnet 31 may have a polarization structure including first through fourth magnet portions 31a, 31b, 31c, and 31d. The first and second magnet portions 31a and 31b have poles opposite to each other and are adjacent to each other. The third and fourth magnet portions 31c and 31d are adjacent to the first and second magnet portions 31a and 31b, respectively, such that at least two sides of the third and fourth magnet portions 31c and 31d are surrounded by the first and second magnet portions 31a and 31b adjacent to the third and fourth magnet portions 31c and 31d, respectively. The third and fourth magnet portions 31c and 31d have poles oriented opposite to the first and second magnet portions 31a and 31b, respectively. In FIG. 4, F denotes the focus direction and T denotes a tracking direction.

Figure 5:
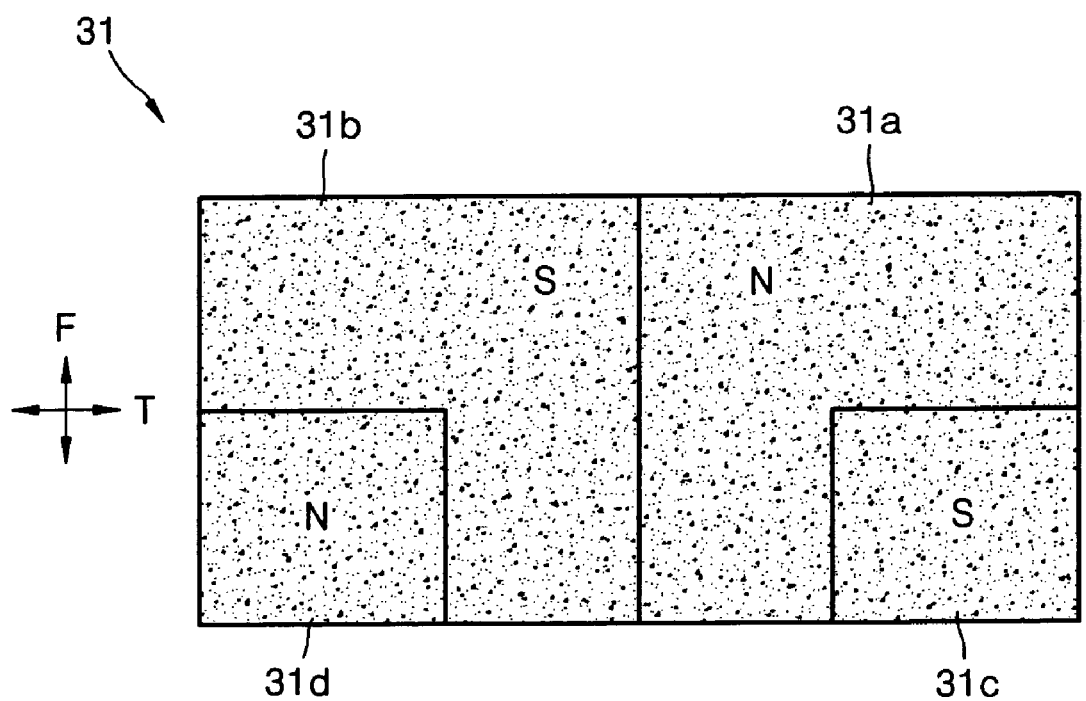
FIG. 5 is a plane view of a magnet for the magnetic circuit shown in FIG. 4.

Referring to FIG. 5, two sides of the third magnet portion 31c can be surrounded by the first magnet portion 31a, and two sides of the fourth magnet portion 31d can be surrounded by the second magnet portion 31b. The second magnet portion 31b can further extend to the right and then down. The first and second magnet portion 31a and 31b may also form a symmetric shape. Hereinafter, for clarity of the description, it will be assumed for this embodiment that the magnet 31 includes the first and second magnet portions 31a and 31b extending to the left and to the right, respectively, and then extending down, thereby forming a symmetric shape. In FIGS. 3 through 5, the third and fourth magnet portions 31c and 31d may be positioned in a downward portion in view of the focus direction. However, at least one of the third and fourth magnet portions 31c and 31d may be positioned in an upward portion in view of the focus direction.

Referring to FIGS. 4 and 5, the magnet 31 can be polarized on a surface facing coils such that the first through fourth magnet portions 31a, 31b, 31c, and 31d have a north pole (N-pole), a south pole (S-pole), a S-pole, and a N-pole, respectively. Alternatively, the magnet 31 may also be polarized in an opposite manner.

When the magnet 31 has the above-described polarization structure, the track coil 32 can be positioned to interact with the first and second magnet portions 31a and 31b. The first focus coil unit 33 is positioned to interact with the first and third magnet portions 31a and 31c. The second coil unit 37 is similarly positioned to interact with the second and fourth magnet portions 31b and 31d.

In FIG. 4, hatched areas are effective coil portions. In other words, hatched areas in the track coil 32 are effective track coil portions. Hatched areas in the first and second focus coil units 33 and 37 are effective focus coil portions.

Figure 6:
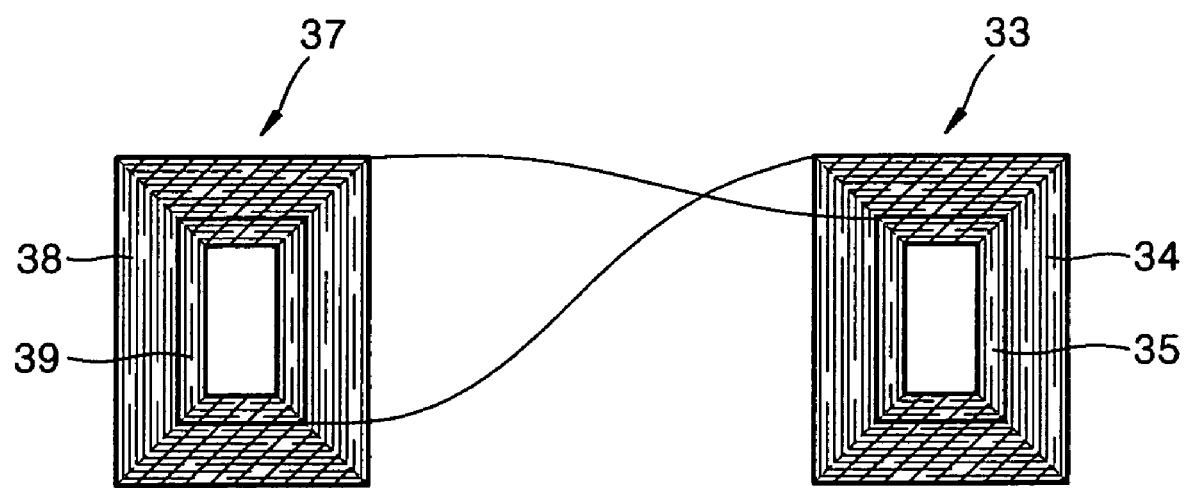
FIG. 6 illustrates focus coils shown in FIG. 4.

Referring to FIG. 6, the first focus coil unit 33 may include a first focus coil 34 and a second focus coil 35 which are different from each other, at least in effective coil length. For example, the second focus coil 35 may have a shorter effective coil length than the first focus coil 34. Similarly, the second focus coil unit 37 may include a third focus coil 38 and a fourth focus coil 39 which are similarly at least different from each other in effective coil length. For example, the fourth focus coil 39 may have a shorter effective coil length than the third focus coil 38.

In FIG. 6, the second and fourth focus coils 35 and 39 can be disposed along the insides of the first and third focus coils 34 and 38, respectively. A positional relationship between the first and second focus coils 34 and 35 and a positional relationship between the third and fourth coils 38 and 39 may of course be modified variously. For example, the first and second focus coils 34 and 35 may overlap each other at a same position, and the third and fourth focus coils 38 and 39 may also overlap each other at a same position, among other arrangements.

In an embodiment of the present invention, one focus coil, e.g., the first focus coil 34, having a longer effective coil length between the first and second focus coils 34 and 35, can be connected with one focus coil, e.g., the fourth focus coil 39, having a shorter effective coil length between the third and fourth focus coils 38 and 39. The other focus coil, e.g., the second focus coil 35, having a shorter effective coil length between the first and second focus coils 34 and 35, can be connected with the other focus coil, e.g., the third focus coil 38, having a longer effective coil length between the third and fourth focus coils 38 and 39.

In addition, the first and second focus coils 34 and 35 can be designed such that current flows in the first and second focus coils 34 and 35 in a same direction in response to a focus driving signal. The third and fourth focus coils 38 and 39 can similarly be designed such that current flows in the third and fourth focus coils 38 and 39 in a same direction.

Figure 7A:
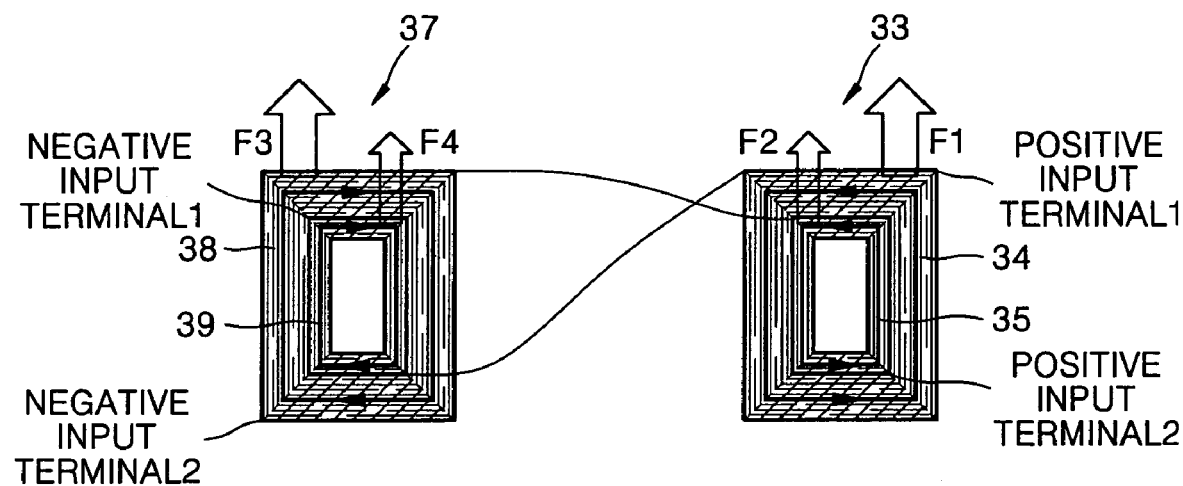
FIG. 7A illustrates a principle of focus driving performed using the magnetic circuit show in FIG. 4, according to an embodiment of the present invention.

For example, as shown in FIG. 7A, the first and second focus coils 34 and 35 can be connected with a positive (+) input terminal 1 and a positive input terminal 2, respectively. The third and fourth focus coils 38 and 39 can similarly be connected with a negative (−) input terminal 1 and a negative input terminal 2, respectively. In this case, the first through fourth focus coils 34, 35, 38, and 39 are formed to have winding directions such that when a pair of focus driving signals having the same phase are applied to the positive input terminal 1 and the positive input terminal 2, respectively, the direction of current flowing in the first focus coil 34 is the same as that of current flowing in the second focus coil 35 and a direction of current flowing in the third focus coil 38 is the same as that of current flowing in the fourth focus coil 39.

Considering the polarization structure of the magnet 31, the direction of current flowing in the first focus coil unit 33, including the first and second focus coils 34 and 35, is opposite to that of current flowing in the second focus coil unit 37, including the third and fourth focus coils 38 and 39. In other words, the first focus coil unit 33 can have a winding direction opposite to the second focus coil unit 34.

In this situation, when tilt driving signals are applied, current flows in the first and second focus coils 34 and 35 in opposite directions, respectively, in the first focus coil unit 33; and current flows in the third and fourth focus coils 38 and 39 in opposite directions, respectively, in the second focus coil unit 37. For example, as shown in FIG. 7B, when a pair of tilt driving signals having opposite phases are applied to the positive input terminal 1 and the positive input terminal 2, respectively, current flows in the first and second focus coils 34 and 35 in opposite directions; and current flows in the third and fourth focus coils 38 and 39 flows in opposite directions.

Accordingly, in focus driving, electromagnetic forces act on the first through fourth focus coils 34, 35, 38, and 39 in a same direction. In tilt driving, electromagnetic forces act on the first and second focus coils 34 and 35 in opposite directions, and electromagnetic forces similarly act on the third and fourth focus coils 38 and 39 in opposite directions.

Referring to FIG. 7A, forces act on both of the first and second coil units 33 and 37, i.e., all of the first through fourth focus coils 34, 35, 38, and 39, in a positive focus direction (i.e., in a +z-direction). Thereafter, when a direction of current flowing in the first through fourth focus coils 34, 35, 38, and 39 is reversed, forces act on all of the first through fourth focus coils 34, 35, 38, and 39 in a negative focus direction (i.e., in a −z-direction). Accordingly, the magnetic circuit according to the above-described embodiment of the present invention can drive an objective lens 14, installed at a moving part of an optical pickup actuator, in a focus direction. When sizes of forces respectively acting on the first through fourth focus coils 34, 35, 38, and 39 in the focus direction, in response to focus driving signals, are represented by F1, F2, F3, and F4, respectively, a focus thrust (Ff) acting during the focus driving is represented by F1+F2+F3+F4.

Figure 7B:
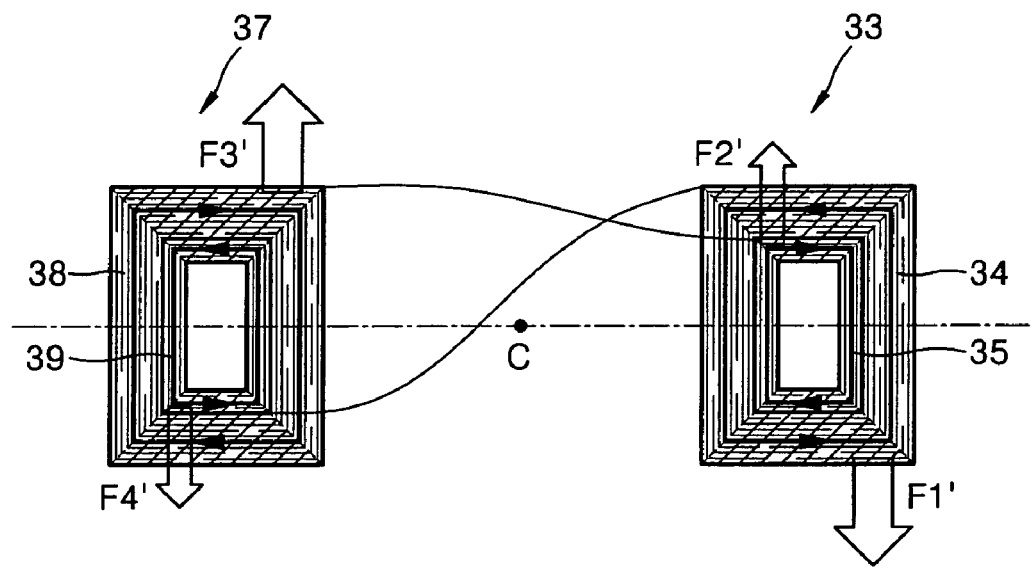
FIG. 7B illustrates a principle of tilt driving performed in the differential mode using the magnetic circuit shown in FIG. 4, according to another embodiment of the present invention.

Referring to FIG. 7B, forces ultimately act on the first focus unit 33 in the negative focus direction (i.e., in the −z-direction), and forces ultimately act on the second focus coil unit 37 in the positive focus direction (i.e., in the +z-direction). Thereafter, when the directions of currents flowing in the first through fourth focus coils 34, 35, 38, and 39 are reversed, the direction of forces acting on each of the first and second focus coil units 33 and 37 are also reversed. Accordingly, a moving part of an optical pickup actuator can be driven in a tilt direction, e.g., in a radial tilt direction, so that a tilt of an objective lens installed at the moving part can be adjusted.

When sizes of forces respectively acting on the first through fourth focus coils 34, 35, 38, and 39, during tilt driving, are represented by F1', F2', F3', and F4', respectively, the size of the force acting on the first focus coil unit 33 in the focus direction corresponds to a difference between sizes of forces acting on the first and second focus coils 34 and 35, respectively, e.g., F1'−F2'. The size of the force acting on the second focus coil unit 37 in the focus direction corresponds to a difference between sizes of forces acting on the third and fourth focus coils 38 and 39, respectively, e.g., F3'−F4'. Accordingly, in this example, when a force having a size of F1'−F2' acts on the first focus coil unit 33 in the negative focus direction, a force having a size of F3'−F4' acts on the second focus coil unit 37 in the positive focus direction. When the directions of the currents flowing in each of the first through fourth focus coils 34, 35, 38, and 39 are reversed, the directions of the forces acting on each of the first and second focus coil units 33 and 37 are also reversed. Accordingly, a focusing torque provoking the tilt driving is R[(F1'+F3')−(F2'+F4')]. Here, "R" corresponds to a distance between a central C of rotation and a central of the force acting on the first and second focus coil units 33 and 37.

Figure 2A:
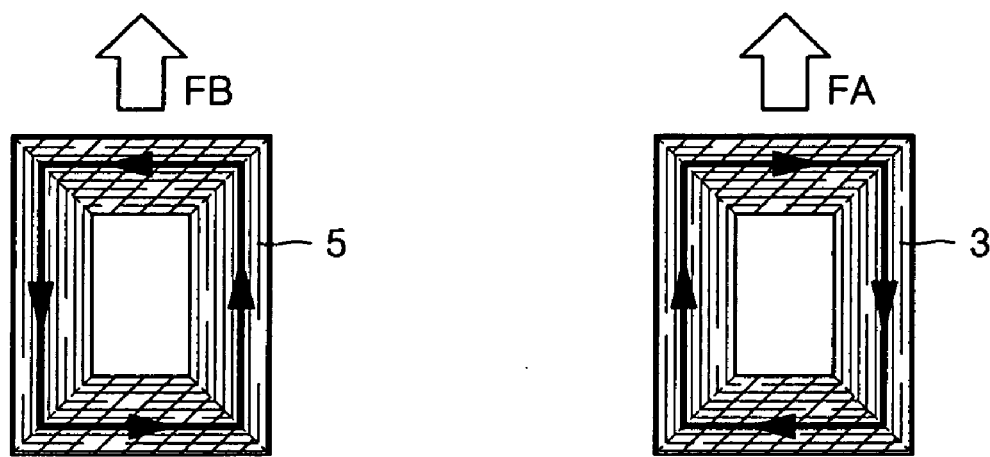
FIG. 2A illustrates a principle of focus driving performed using the conventional magnetic circuit shown in FIG. 1.
Figure 2B:
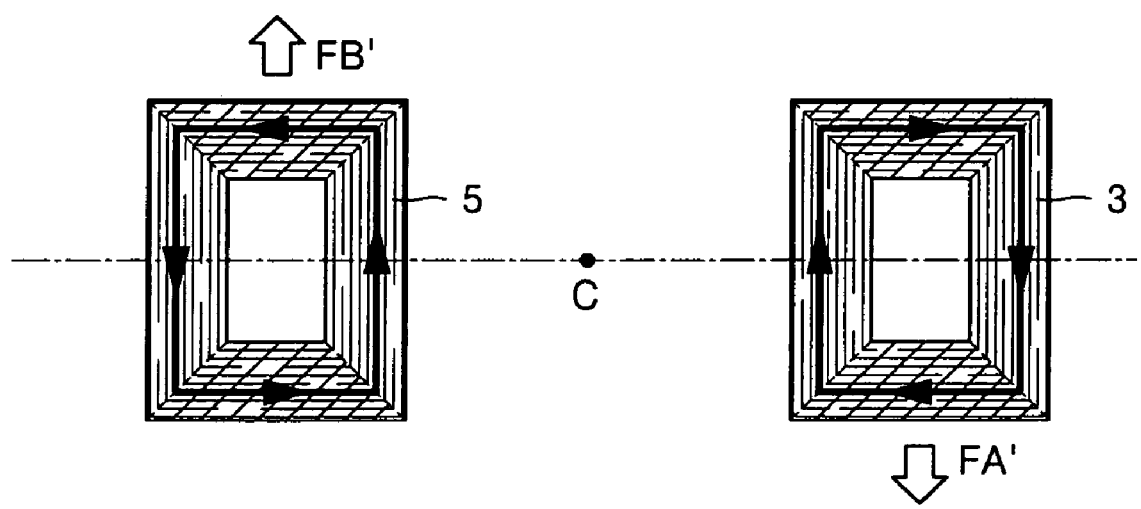
FIG. 2B illustrates a principle of tilt driving performed in a differential mode using the conventional magnetic circuit shown in FIG. 1.

The following description concerns a comparison between a principle of tilt driving illustrated in FIG. 7B and a principle of conventional tilt driving illustrated in FIG. 2B. For example, the size FA' of the force acting on the first focus coil 3 shown in FIG. 2B corresponds to F1'+F2' shown in FIG. 7B, and the size FB' of the force acting on the second focus coil 5 shown in FIG. 2B corresponds to F3'+F4' shown in FIG. 7B.

Accordingly, when effective coil lengths of the respective conventional focus coils 3 and 5 are respectively the same as those of the first and second focus coil units 33 and 37, and tilt driving signals having the same magnitude as those used in the conventional art as in an embodiment of the present invention, a focusing torque provoking tilt driving is R(FA'+FB'), i.e., R(F1'+F2'+F3'+F4') in the conventional art but becomes R[(F1'+F3')−(F2'+F4')] in the above embodiment of the present invention. In other words, a magnetic circuit according to the present invention reduces focusing torque provoking tilt driving compared to the conventional art.

As a result, a magnetic circuit according to an embodiment of the present invention provides a lower tilt sensitivity than a conventional magnetic circuit with the same focus sensitivity.

In addition, in embodiments of the present invention, tilt sensitivity can be freely adjusted by changing the relative numbers of windings of the first focus coil 34 to windings of the fourth focus coil 39 and the relative numbers of windings of the second focus coil 35 to windings of the third focus coil 38.

Meanwhile, an entire effective coil length in the first and second focus coils 34 and 35 may also be the same as that in the third and fourth focus coils 38 and 39. In detail, entire effective coil lengths in the connected first and fourth focus coils 34 and 39 may be the same as those in the connected second and third focus coils 35 and 38.

In addition, the first and third focus coils 34 and 38 may similarly have the same effective coil length, and the second and fourth focus coils 35 and 39 may have the same effective coil length. In this case, when a pair of focus driving signals, having the same phase, are applied, forces act on the first and second focus coils 34 and 35 in the same direction and with the same size as forces acting on the third and fourth focus coils 38 and 39.

In an embodiment of the present invention, at least one among the first and second focus coil units 33 and 37, and the track coil 32, may be made using a fine pattern coil manufactured by patterning a film with a coil shape. A fine pattern coil is thin, thereby reducing the weight of a moving part of an actuator and compacting the actuator. FIG. 3 shows an example of the first and second focus coil units 33 and 37 and the track coil 32 that are made in the form of the fine pattern coil on a single film. Alternatively, at least one among the first and second focus coil units 33 and 37 and the track coil 32 may be made using a bulk type coil manufactured by winding a copper wire, as just another example.

Meanwhile, when current flows in the track coil 32 clockwise, force acts on the track coil 32 in the left direction (in a −y-direction). If the direction of the current applied to the track coil 32 is reversed, the force acts on the track coil 32 in the right direction (in a +y-direction).

As is inferred from the description with reference to FIGS. 7A and 7B, a magnetic circuit according to the embodiment illustrated in FIG. 4 can perform tilt driving in a differential mode, realize high focus sensitivity, and reduce tilt sensitivity enough not to provoke unnecessary tilt driving, by using the plurality of the focus coil units 33 and 37. Accordingly, an optical pickup actuator using a magnetic circuit according to an embodiment of the present invention, e.g., the embodiment illustrated in FIG. 4, can drive the objective lens 14 (shown in FIG. 3) installed in a moving part of the optical pickup actuator in the focus direction with high sensitivity. In addition, the moving part of the optical pickup actuator can be driven in the tilt direction, e.g., in the radial tilt direction, and can adjust a tilt of the objective lens 14. Thus, according to embodiments of the present invention, unnecessary tilt driving is not provoked, focus driving can be reliably performed in a state where a tilt driving signal remains zero.

In addition, since a moving part of the optical pickup actuator using a magnetic circuit according to an embodiment of the present invention, e.g., the embodiment illustrated in FIG. 4, can also be driven in the tracking direction, the objective lens 14 installed in the moving part can be controlled to correctly follow tracks on an optical disk.

Consequently, when a pair of magnetic circuits, according to an embodiment of the present invention, e.g., the embodiment illustrated in FIG. 4, are installed along opposite sides, respectively, of the moving part of the optical pickup actuator, the moving part can be driven along three axes, e.g., in the focus, tracking and radial tilt directions. When the optical pickup actuator is driven using asynchronous tangential tilt driving signals, such that a magnetic circuit installed on the side 15a of the lens holder 15 has a magnetic force acting downward whereas a magnetic circuit installed on the opposite side 15b of the lens holder 15 has a magnetic force acting upward, the lens holder 15, i.e., the moving part, can also be driven in the tangential tilt direction.

Accordingly, when the currents applied to the first through fourth focus coils 34, 35, 38, and 39, in each of the two magnetic circuits, are controlled as described above, a moving part of an optical pickup actuator, according to the present invention, can be driven along three or four axes. Here, tilt driving and focus driving can also be simultaneously performed. For example, while the focus driving is performed by applying focus driving signals to a magnetic circuit to provoke focus thrust in the first through fourth focus coils 34, 35, 38, and 39 in a same direction, asynchronous radial and/or tangential tilt driving signals can also be applied to the magnetic circuit so that the focus driving and the tilt driving are performed simultaneously.

Meanwhile, a magnetic circuit according to an embodiment of the present invention can have a structure in which a focus coil is used for both of the focus driving and the tilt driving without using a separate tilt coil. Accordingly, the weight of the corresponding moving part of an optical pickup actuator can be reduced, and therefore, alternating current (AC) sensitivity can also be enhanced.

In addition, since the magnetic circuit, according to an embodiment of the present invention, e.g., illustrated in FIG. 4, includes a single track coil 32, an effective coil length in the track coil 32 used for driving in the tracking direction can be increased compared to a conventional structure having two track coils disposed in the focus direction. Accordingly, a thin optical pickup actuator with a decreased height and satisfactory tracking performance can be realized.

Figure 8:
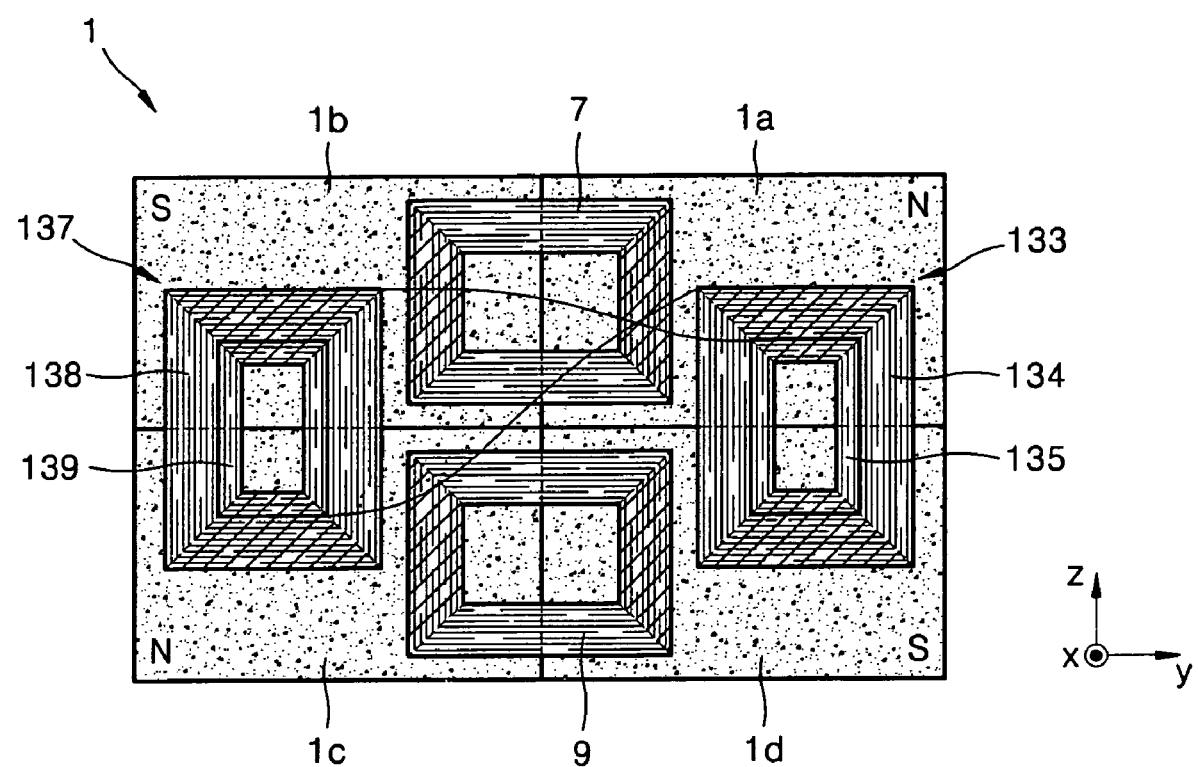
FIG. 8 is a schematic diagram of a magnetic circuit, according to still another embodiment of the present invention.

FIG. 8 illustrates a magnetic circuit according to still another embodiment of the present invention. The magnetic circuit shown in FIG. 8 includes a magnet and track coils similar to the conventional magnetic circuit shown in FIG. 1, with at least a different focus coil structure. Thus, the magnet and the track coils shown in FIG. 8 will be discussed with the same reference numerals as those shown in FIG. 1, with redundant descriptions thereof being omitted.

Referring to FIG. 8, the magnetic circuit includes the two track coils 7 and 9, the four-pole magnet 1, and first and second focus coil units 133 and 137.

The first focus coil unit 133 includes first and second focus coils 134 and 135, having different effective coil lengths, and the second coil unit 137 includes third and fourth focus coils 138 and 139, having different effective coil lengths. The first focus coil 134 is connected with the fourth focus coil 139, and the second focus coil 135 is connected with the third focus coil 138.

Positional relationships and operating principles between the first through fourth focus coils 134, 135, 138, and 139, and the respective magnet portions 1a through 1d shown in FIG. 8, are substantially similar to those between the first through fourth focus coils 34, 35, 38, and 39 and the respective magnet portions 31a through 31d shown in FIGS. 3 through 7B. Thus, a detailed description of principles of focus driving and tilt driving due to the first through fourth focus coils 134, 135, 138, and 139 will be omitted.

When a pair of magnetic circuits, according to the embodiment illustrated in FIG. 8, are installed along opposite sides, respectively, of a moving part of an optical pickup actuator, if the optical pickup actuator is driven using asynchronous tangential tilt driving signals, such that a magnetic circuit installed on the side 15a of the lens holder 15 has a magnetic force acting downward whereas a magnetic circuit installed on the opposite side 15b of the lens holder 15 has a magnetic force acting upward, the lens holder 15, i.e., the moving part, can be driven in the tangential tilt direction.

Accordingly, when currents applied to the first through fourth focus coils 134, 135, 138, and 139, in each of the two magnetic circuits, are controlled in the same manner as the one embodiment of the present invention illustrated in FIG. 4, a moving part of an optical pickup actuator, according to the other embodiment of the present invention, can be driven along three or four axes.

Magnetic circuits of the present invention have been described with reference to a few exemplary embodiments but are not restricted thereto. In other words, a magnetic circuit of the present invention may include a first focus coil unit and a second focus coil unit, each of which includes two focus coils having different effective coil lengths, with a focus coil having a longer effective coil length in one focus coil unit being connected with a focus coil having a shorter effective coil length in the other focus coil unit. A polarization structure of a magnet included in the magnetic circuit and a shape and disposition of a track coil may be modified in various ways. For example, a magnetic circuit according to an embodiment of the present invention may include more than one pair of first and second focus coil units.

Figure 9:
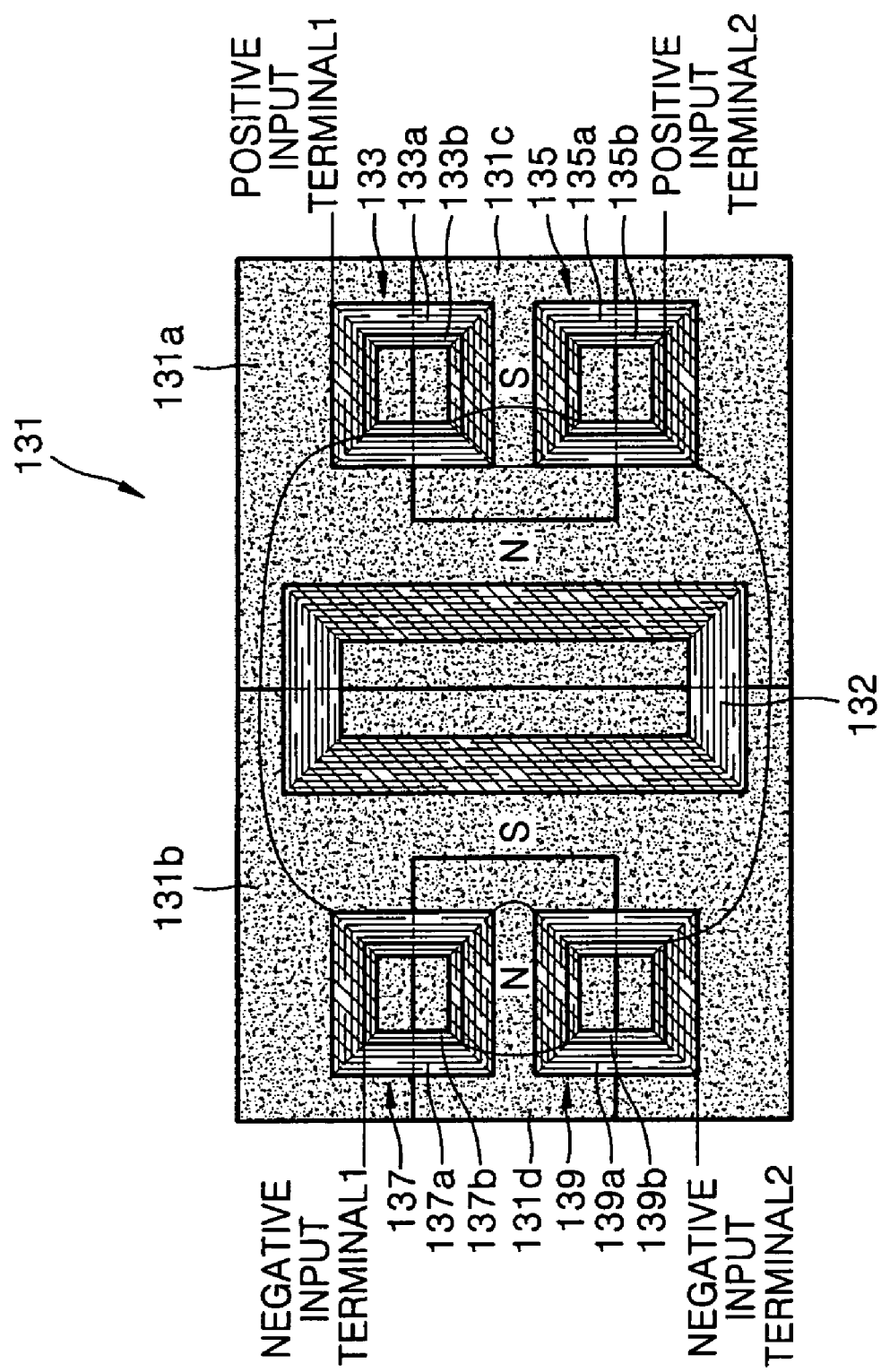
FIG. 9 is a schematic diagram of a magnetic circuit, according to yet still another embodiment of the present invention.

Referring to FIG. 9, a magnetic circuit, according to still another embodiment of the present invention, includes a magnet 131 and first through fourth focus coil units 133, 135, 137, and 139 which are used to drive the lens holder 15, according to an embodiment of the present invention, e.g., the embodiment shown in FIG. 3, in both the focus and tilt directions. The magnetic circuit may further include a track coil 132 to drive the lens holder 15 in the tracking direction. A positional relationship between the track coil 132 and the magnet 131 and a driving principle for tracking in the magnetic circuit shown in FIG. 9 may be substantially similar as that between the track coil 32 and the magnet 31 and that in the magnetic circuit shown in FIG. 4.

The magnet 131 may have a polarization structure including first through fourth magnet portions 131a, 131b, 131c, and 131d. The first and second magnet portions 131a and 131b may have poles opposite to each other and may be adjacent to each other. The third and fourth magnet portions 131c and 131d may be adjacent to the first and second magnet portions 131a and 131b, respectively, such that three sides of the third and fourth magnet portions 131c and 131d are surrounded by the first and second magnet portions 131a and 131b adjacent to the third and fourth magnet portions 131c and 131d, respectively. The third and fourth magnet portions 131c and 131d may have poles opposite to the first and second magnet portions 131a and 131b, respectively. Similar to above, F will be referenced as corresponding to the focus direction, with T similarly corresponding to the tracking direction.

Three sides of the third magnet portion 131c can be surrounded by the first magnet portion 131a, and three sides of the fourth magnet portion 131d can be surrounded by the second magnet portion 131b. The first magnet portion 131a can thus extend to the left, then down, and then to the right. The first and second magnet portion 131a and 131b may also form a symmetric shape.

In FIG. 9, the magnet 131 is polarized on a surface facing coils such that the first through fourth magnet portions 131a, 131b, 131c, and 131d have a N-pole, a S-pole, a S-pole, and a N-pole, respectively. Alternatively, the magnet 131 may be polarized in an opposite manner.

When the magnet 131 has the above-described polarization structure, the track coil 132 can be positioned to interact with the first and second magnet portions 131a and 131b. The first and second focus coil units 133 and 135 may be positioned in the focus direction to interact with the first and third magnet portions 131a and 131c, and the third and fourth coil units 137 and 139 may be positioned in the focus direction to interact with the second and fourth magnet portions 131b and 131d, for example.

The first focus coil unit 133 can be disposed to interact with an upper portion of the first magnet portion 131a and the third magnet portion 131c while the second focus coil unit 135 may be disposed to interact with a lower portion of the first magnet portion 131a and the third magnet portion 131c. The third focus coil unit 137 may similarly be disposed to interact with an upper portion of the second magnet portion 131b and the fourth magnet portion 131d while the fourth focus coil unit 139 may be disposed to interact with a lower portion of the second magnet portion 131b and the fourth magnet portion 131d.

In FIG. 9, hatched areas are effective coil portions. In other words, hatched areas in the track coil 132 are effective track coil portions. Hatched areas in the first through fourth focus coil units 133, 135, 137, and 139 are effective focus coil portions.

The first focus coil unit 133 may include a first focus coil 133a and a second focus coil 133b, which may be different from each other, at least in effective coil length. For example, the second focus coil 133b may have a shorter effective coil length than the first focus coil 133a. Similarly, the second through fourth focus coil units 135, 137, and 139 include first focus coils 135a, 137a, and 139a, respectively, and second focus coils 135b, 137b, and 139b, respectively. The first focus coils 135a, 137a, and 139a may have at least different effective coil lengths, for example, from the second focus coils 135b, 137b, and 139b, respectively. For example, the second focus coils 135b, 137b, and 139b may have shorter effective coil lengths than the first focus coils 135a, 137a, and 139a, respectively.

In FIG. 9, the second focus coils 133b, 135b, 137b, and 139b may be disposed along insides of the first focus coils 133a, 135a, 137a, and 139a, respectively. Positional relationships between the first focus coils 133a, 135a, 137a, and 139a and the respective second focus coils 133b, 135b, 137b, and 139b may also be modified variously. For example, the first focus coils 133a, 135a, 137a, and 139a may overlap the second focus coils 133b, 135b, 137b, and 139b, respectively, at the same position.

In addition, the first and second focus coils 133a and 133b of the first focus coil unit 133 may be respectively connected with the first and second focus coils 135a and 135b of the second focus coil unit 135. Similarly, the first and second focus coils 137a and 137b of the third focus coil unit 137 may be respectively connected with the first and second focus coils 139a and 139b of the fourth focus coil unit 139.

In this case, a polarization direction of the first magnet portion 131a, facing an upper effective coil portion of the first and second focus coils 133a and 133b of the first focus coil unit 133, may be opposite to a polarization direction of the third magnet portion 131c, facing an upper effective coil portion of the first and second focus coils 135a and 135b of the second focus coil unit 135. Accordingly, the first focus coil 133a of the first focus coil unit 133 may be wound in a direction opposite to a direction in which the first focus coil 135a of the second focus coil unit 135 is wound, and the second focus coil 133b of the first focus coil unit 133 may be wound in a direction opposite to a direction in which the second focus coil 135b of the second focus coil unit 135 is wound, so that electromagnetic forces act on the first focus coils 133a and 135a of the respective first and second focus coil units 133 and 135 in the same direction and forces act on the second focus coils 133b and 135b of the respective first and second focus coil units 133 and 135 in the same direction.

In addition, the polarization direction of the second magnet portion 131b facing an upper effective coil portion of the first and second focus coils 137a and 137b of the third focus coil unit 137 is opposite to a polarization direction of the fourth magnet portion 131d facing an upper effective coil portion of the first and second focus coils 139a and 139b of the fourth focus coil unit 139. Accordingly, the first focus coil 137a of the third focus coil unit 137 may be wound in a direction opposite to a direction in which the first focus coil 139a of the fourth focus coil unit 139 is wound, and the second focus coil 137b of the third focus coil unit 137 may be wound in a direction opposite to a direction in which the second focus coil 139b of the fourth focus coil unit 139 is wound, so that electromagnetic forces act on the first focus coils 137a and 139a of the respective third and fourth focus coil units 137 and 139 in the same direction and forces act on the second focus coils 137b and 139b of the respective third and fourth focus coil units 137 and 139 in the same direction.

In addition, one focus coil having a shorter effective coil length, e.g., the second focus coil 133b, between the first and second focus coils 133a and 133b of the first focus coil unit 133 may be connected with one focus coil having a longer effective coil length, e.g., the first focus coil 137a, between the first and second focus coils 137a and 137b of the third focus coil unit 137. Similarly, one focus coil having a longer effective coil length, e.g., the first focus coil 135a, between the first and second focus coils 135a and 135b of the second focus coil unit 135 may be connected with one focus coil having a shorter effective coil length, e.g., the second focus coil 139b, between the first and second focus coils 139a and 139b of the fourth focus coil unit 139.

In response to focus driving signals, currents flow in the same direction in the first and second focus coils 133a, 139a, 133b, and 139b of the respective first and fourth focus coil units 133 and 139 while currents flow in the same direction in the first and second focus coils 135a, 137a, 135b, and 137b of the respective second and third focus coil units 135 and 137. The directions of the currents flowing in the first and fourth focus coil units 133 and 139 are opposite to the directions of the currents flowing in the second and third focus coil units 135 and 137.

In other words, as shown in FIG. 9, the first focus coil 133a of the first focus coil unit 133 can be connected with a positive input terminal 1, and the second focus coil 135b of the second focus coil unit 135 may be connected with a positive input terminal 2. The second focus coil 137b of the third focus coil unit 137 may be connected with a negative input terminal 1, and the first focus coil 139a of the fourth focus coil unit 139 may be connected with a negative input terminal 2. The first through fourth focus coil units 133, 135, 137, and 139 are designed to have winding directions such that currents flow in the same direction in the focus coils 133a, 133b, 139a, and 139b of the respective first and fourth focus coil units 133 and 139, while currents flow in the same direction in the focus coils 135a, 135b, 137a, and 137b of the respective second and third focus coil units 135 and 137, when a pair of focus driving signals having the same phase are applied to the positive input terminal 1 and the positive input terminal 2, respectively.

Considering the polarization structure of the magnet 131, winding directions of the focus coils 133a, 133b, 139a, and 139b of the respective first and fourth focus coil units 133 and 139 are opposite to that of the focus coils 135a, 135b, 137a, and 137b of the respective second and third focus coil units 135 and 137 so that the directions of currents flowing in the first and fourth focus coil units 133 and 139 are opposite to the directions of currents flowing in the second and third focus coil units 135 and 137, with respect to a pair of focus driving signal having the same phases. As a result, focus driving forces act in the same direction with respect to the first through fourth focus coil units 133, 135, 137, and 139.

When a pair of tilt driving signals, having opposite phases, are applied to the positive input terminal 1 and the positive input terminal 2, currents flow in opposite directions in the first focus coil 133a, 135a, 137a, or 139a and the second focus coil 133b, 135b, 137b, or 139b, in each of the first through fourth focus coil units 133, 135, 137, and 139, respectively.

In focus driving, since electromagnetic forces act in the same direction in the first and second focus coils 133a, 135a, 137a, 139a, 133b, 135b, 137b, and 139b in the first through fourth focus coil units 133, 135, 137, and 139, respectively, a focus thrust acting in the focus driving corresponds to a sum of the electromagnetic forces acting on all of the focus coils 133a, 135a, 137a, 139a, 133b, 135b, 137b, and 139b.

The magnetic circuit with the four focus coil units 133, 135, 137, and 139, according to an embodiment of the present invention, e.g., the embodiment illustrated in FIG. 9, increases the focus thrust compared to the magnetic circuit with the two focus coil units 33 and 37 according to other embodiments of the present invention, e.g., the embodiment illustrated in FIG. 4.

In tilt driving, directions of electromagnetic forces acting on the first focus coils 133a, 135a, 137a, or 139a are opposite to the electromagnetic forces acting on the second focus coils 133b, 135b, 137b, or 139b. Directions of respective resultant forces acting on the first and second focus coils 133a and 133b, of the first focus coil unit 133, are the same as that of the respective resultant forces acting on the first and second focus coils 135a and 135b, of the second focus coil unit 135. Similarly, the directions of respective resultant forces acting on the first and second focus coils 137a and 137b, of the third focus coil unit 137, are the same as that of the respective resultant forces acting on the first and second focus coils 139a and 139b, of the fourth focus coil unit 139. Further, the directions of the respective resultant forces acting on the first and second focus coil units 133 and 135 are opposite to that of the respective resultant forces acting on the third and fourth focus coil units 137 and 139. Accordingly, a moving part of an optical pickup actuator can be driven in the tilt direction, e.g., in the radial tilt direction, so that a tilt of an objective lens installed at the moving part can be adjusted.

When differences in effective coil lengths between the first focus coils 133a, 135a, 137a, or 139a and the second focus coils 133b, 135b, 137b, or 139b, in each of the respective first through fourth focus coil units 133, 135, 137, and 139, are respectively about half the difference in the effective coil length between the focus coils in each of the focus coil units 33 and 37, in the embodiment illustrated in FIG. 4, a focus torque provided in an embodiment of the present invention, e.g., the embodiment illustrated in FIG. 9, may be almost the same as that provided in the embodiment illustrated in FIG. 4. In other words, when the number of focus coil units is increased, the focus thrust can also be increased, and the focus torque, which provokes the tilt driving, can be maintained at an appropriate level to desirable tilt sensitivity.

When necessary, a focus torque can be adjusted by adjusting the differences in the effective coil lengths between two focus coils in each focus coil unit. In addition, according to embodiments of the present invention, even when a magnetic circuit with two focus coil units is modified to have four or more focus coil units, by changing disposition of focus coils and a polarization structure of a magnet, the focus thrust and the focus torque remain.

A procedure for obtaining the focus torque and a value of the focus torque in the embodiment illustrated in FIG. 9 can be inferred from the description above, and thus a detailed description thereof will be omitted.

As described above, when an optical pickup actuator uses a magnetic circuit according to an embodiment of the present invention, the optical pickup actuator can drive an objective lens, installed at its moving part, in the focus direction and also in the tilt direction, e.g., in the radial tilt direction, thereby adjusting a tilt of the objective lens. Here, the optical pickup actuator can operate with high focus sensitivity and with tilt sensitivity appropriate to prevent the occurrence of unnecessary tilt driving. Consequently, even though only a single circuit is used for both of focus control and tilt control, occurrences of unnecessary tilt driving can be prevented.

In a magnetic circuit according to embodiments of the present invention, a focus coil having a longer effective coil length in one focus coil unit can be connected with a focus coil having a shorter effective coil length in another focus coil unit, and two focus driving signals having the same phase and/or two tilt driving signals having opposite phases can be applied to two focus coils of a focus coil unit. Accordingly, even though power for tilt driving has been set to zero, when tilt driving signals having magnitudes of, for example, about ±25 mV are applied since one circuit is used for both of focus control and tilt control, undesired tilt driving does not occur since the tilt sensitivity has been decreased compared to focus sensitivity. Consequently, unnecessary tilt driving can be prevented from occurring without sacrificing the focus sensitivity.

Figure 10:
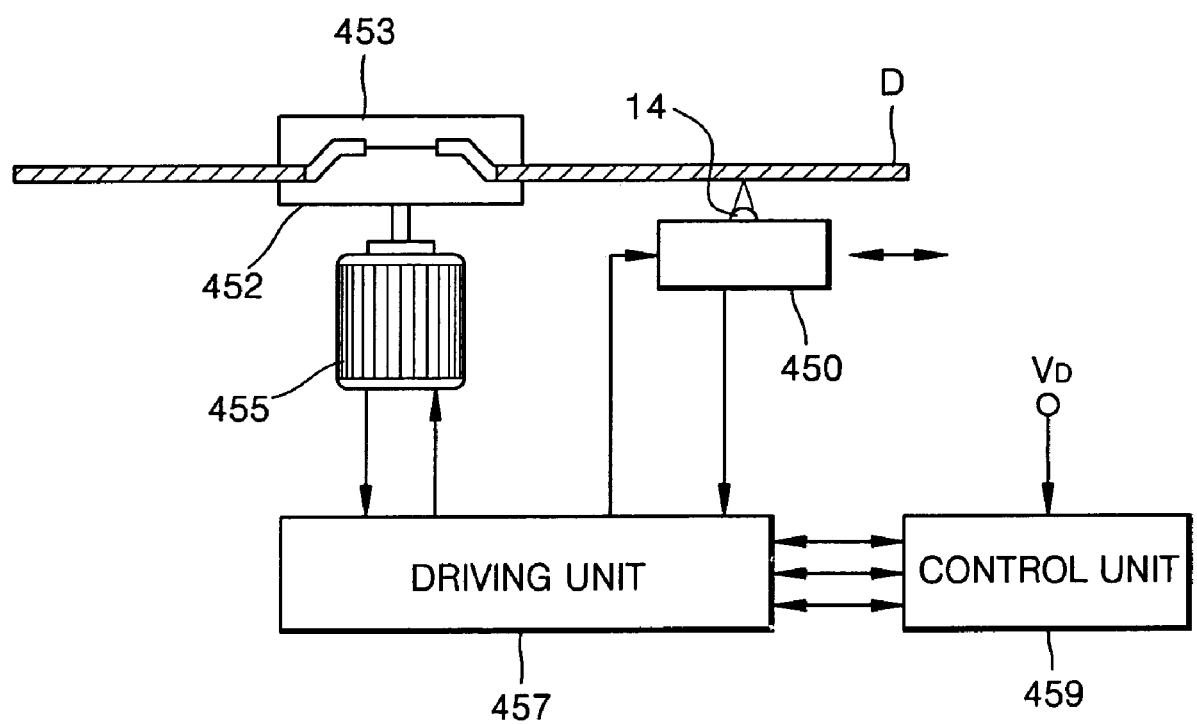
FIG. 10 is a schematic diagram of an optical recording and/or reproducing apparatus using an optical pickup actuator, according to an embodiment of the present invention.

FIG. 10 is a schematic diagram of an optical recording and/or reproducing apparatus using an optical pickup actuator according to the present invention. Referring to FIG. 10, the optical recording and/or reproducing apparatus may include a spindle motor 455 rotating an optical information storage medium, e.g., an optical disk D, an optical pickup 450 installed to move in a radial direction of the optical information storage medium and records and/or reproduces information into and/or from the optical information storage medium, a driving unit 457 driving the spindle motor 455 and the optical pickup 450, and a control unit 459 controlling a focus servo, a tracking servo, and/or a tilt servo of the optical pickup 450. Reference numeral 452 denotes a turntable, and reference numeral 453 denotes a clamp chucking the optical information storage medium, for example.

The optical pickup 450 may also include an optical system with an objective lens 14 converging light emitted from a light source to the optical information storage medium and an optical pickup actuator driving the objective lens 14. The optical pickup actuator uses a magnetic circuit according to an embodiment of the present invention.

The light reflected from the optical information storage medium is detected by a photodetector provided in the optical pickup 450 and is then converted into an electrical signal through photoelectric conversion. The electrical signal is then input to the control unit 459 via the driving unit 457. The driving unit 457 controls a rotation speed of the spindle motor 455, amplifies an input signal, and drives the optical pickup 450. The control unit 459 adjusts at least one among a focus servo command, a tracking servo command, and a tilt servo command based on a signal received from the driving unit 457 and sends the at least one adjusted command to the driving unit 457 to implement at least one among focus, tracking and tilt servo operations of the optical pickup 450.

Such an optical recording and/or reproducing apparatus according to an embodiment of the present invention provides satisfactory focus sensitivity and prevents occurrence of unnecessary tilt driving.

As described above, according embodiments of the present invention, even when a plurality of focus coils are used for both focus driving and tilt driving, unnecessary tilt driving can be prevented from occurring without sacrificing focus sensitivity.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A magnetic circuit, comprising:
a plurality of focus coil units; and
a magnet comprising a plurality of magnet portions to interact with the plurality of focus coil units, each magnet portion being polarized in a direction opposite to an adjacent magnet portion, of the plurality of magnet portions,
wherein electromagnetic forces act on at least two focus coils, of at least one of the plurality of focus coil units, in respectively same directions in response to focus driving signals and in respectively opposite directions in response to tilt driving signals,
wherein the at least two focus coils have different effective coil lengths,
wherein each of the plurality of focus coil units comprise a first focus coil unit, comprising at least two focus coils, and a second focus coil unit, comprising at least two focus coils, and
wherein a focus coil of the first focus coil unit, having a longer effective coil length than another focus coil of the first focus coil unit, is connected with a focus coil of the second focus coil unit, having a shorter effective coil length than another focus coil of the second focus coil unit.

2. The magnetic circuit of claim 1, wherein an effective overall coil length in the at least two focus coils of the first focus coil unit is the same as an effective overall coil length in the at least two focus coils of the second focus coil unit.

3. The magnetic circuit of claim 1, wherein an effective coil length of a first focus coil of the first focus coil unit is a same as an effective coil length of a second focus coil of the second focus coil unit, and an effective coil length of a second focus coil of the first focus coil unit is a same as an effective coil length of a first focus coil of the second focus coil unit.

4. The magnetic circuit of claim 1, wherein the plurality of magnet portions further comprise at least four magnet portions, comprising:
a first magnet portion and a second magnet portion polarized in opposite directions to interact with the first focus coil unit; and
a third magnet portion and a fourth magnet portion polarized in opposite directions to interact with the second focus coil unit.

5. The magnetic circuit of claim 1, wherein the plurality of magnet portions further comprise at least four magnet portions, comprising:
a first magnet portion and a second magnet portion polarized in opposite directions to interact with the first focus coil unit; and a third magnet portion and a fourth magnet portion polarized in opposite directions to interact with the second focus coil unit.

6. The magnetic circuit of claim 1, wherein the plurality of focus coil units further comprise:
a first focus coil unit and a second focus coil unit disposed in a focus direction; and
a third focus coil unit and a fourth focus coil unit disposed in the focus direction and separated from the first and second focus coil units in a tracking direction.

7. The magnetic circuit of claim 6, wherein a focus coil of the first focus coil unit, having a longer effective coil length than another focus coil of the first focus coil unit, is connected with a focus coil of the second focus coil unit, having a longer effective coil length than another focus coil in the second focus coil unit, and the other focus coil of the first focus coil unit is connected with the other focus coil of the second focus coil unit, and
wherein a focus coil of the third focus coil unit, having a longer effective coil length than another focus coil of the third focus coil unit, is connected with a focus coil of the fourth coil unit, having a longer effective coil length than another focus coil of the fourth focus coil unit, and the other focus coil of the third focus coil unit is connected with the other focus coil of the fourth focus coil unit.

8. The magnetic circuit of claim 7, wherein the focus coil of the first focus coil unit is connected with the other focus coil of the third focus coil unit and the other focus coil unit of the second focus coil unit is connected with the focus coil of the fourth focus coil unit.

9. The magnetic circuit of claim 7, wherein the plurality of magnet portions comprise at least four magnet portions, comprising:
a first magnet portion and a second magnet portion polarized in opposite directions to interact with the first and second focus coil units, the second magnet portion partially surrounding the first magnet portion; and
a third magnet portion and a fourth magnet portion polarized in opposite directions to interact with the third and fourth focus coil units, the fourth magnet portion partially surrounding the third magnet portion.

10. The magnetic circuit of claim 6, wherein the plurality of magnet portions comprise at least four magnet portions, comprising:
a first magnet portion and a second magnet portion polarized in opposite directions to interact with the first and second focus coil units, the second magnet portion partially surrounding the first magnet portion; and
a third magnet portion and a fourth magnet portion polarized in opposite directions to interact with the third and fourth focus coil units, the fourth magnet portion partially surrounding the third magnet portion.

11. The magnetic circuit of claim 1, wherein a first focus coil and a second focus coil, of the at least two focus coils, have a same entire effective coil length, throughout the plurality of focus coil units.

12. The magnetic circuit of claim 1, further comprising at least one track coil disposed to interact with the magnet and used for tracking driving.

13. An optical pickup actuator comprising:
a lens holder mounted with an objective lens;
a support member, with one end of the support member being fixed to a side of the lens holder and another end of the support member being fixed to a holder provided on one end portion of a base to enable the lens holder to move with respect to the base; and
a pair of magnetic circuits disposed on opposite sides of the lens holder
wherein each of the magnetic circuits comprises:
a plurality of focus coil units; and
a magnet comprising a plurality of magnet portions to interact with the plurality of focus coil units, each magnet portion being polarized in a direction opposite to an adjacent magnet portion, of the plurality of magnet portions,
wherein electromagnetic forces act on at least two focus coils, of at least one of the plurality of the focus coil units, in respectively same directions in response to focus driving signals and in respectively opposite directions in response to tilt driving signals,
wherein the at least two first and second focus coils have different effective coil lengths,
wherein each of the plurality of focus coil units comprise a first focus coil unit, comprising at least two focus coils, and a second focus coil unit, comprising at least two focus coils, and
wherein a focus coil of the first focus coil unit, having a longer effective coil length than another focus coil of the first focus coil unit, is connected with a focus coil of the second focus coil unit, having a shorter effective coil length than another focus coil of the second focus coil unit.

14. The optical pickup actuator of claim 13, wherein an effective overall coil length in the at least two focus coils of the first focus coil unit is the same as an effective overall coil length in the at least two focus coils of the second focus coil unit.

15. The optical pickup actuator of claim 13, wherein an effective coil length of a first focus coil of the first focus coil unit is a same as an effective coil length of a second focus coil of the second focus coil unit, and an effective coil length of a second focus coil of the first focus coil unit is a same as an effective coil length of a first focus coil of the second focus coil unit.

16. The optical pickup actuator of claim 13, wherein the plurality of magnet portions further comprise at least four magnet portions, comprising:
a first magnet portion and a second magnet portion polarized in opposite directions to interact with the first focus coil unit; and
a third magnet portion and a fourth magnet portion polarized in opposite directions to interact with the second focus coil unit.

17. The optical pickup actuator of claim 13, wherein the plurality of magnet portions further comprise at least four magnet portions, comprising:
a first magnet portion and a second magnet portion polarized in opposite directions to interact with the first focus coil unit; and
a third magnet portion and a fourth magnet portion polarized in opposite directions to interact with the second focus coil unit.

18. The optical pickup actuator of claim 13, wherein the plurality of focus coil units further comprise:
a first focus coil unit and a second focus coil unit disposed in a focus direction; and
a third focus coil unit and a fourth focus coil unit disposed in the focus direction and separated from the first and second focus coil units in a tracking direction.

19. The optical pickup actuator of claim 18, wherein a focus coil of the first focus coil unit, having a longer effective coil length than another focus coil of the first focus coil unit, is connected with a focus coil of the second focus coil unit, having a longer effective coil length than another focus coil in the second focus coil unit, and the other focus coil of the first focus coil unit is connected with the other focus coil of the second focus coil unit, and wherein a focus coil of the third focus coil unit, having a longer effective coil length than another focus coil of the third focus coil unit, is connected with a focus coil of the fourth coil unit, having a longer effective coil length than another focus coil of the fourth focus coil unit, and the other focus coil of the third focus coil unit is connected with the other focus coil of the fourth focus coil unit.

20. The optical pickup actuator of claim 19, wherein the focus coil of the first focus coil unit is connected with the other focus coil of the third focus coil unit and the other focus coil unit of the second focus coil unit is connected with the focus coil of the fourth focus coil unit.

21. The optical pickup actuator of claim 19, wherein the plurality of magnet portions comprise at least four magnet portions, comprising:

a first magnet portion and a second magnet portion polarized in opposite directions to interact with the first and second focus coil units, the second magnet portion partially surrounding the first magnet portion; and a third magnet portion and a fourth magnet portion polarized in opposite directions to interact with the third and fourth focus coil units, the fourth magnet portion partially surrounding the third magnet portion.

22. The optical pickup actuator of claim 18, wherein the plurality of magnet portions comprise at least four magnet portions, comprising:

a first magnet portion and a second magnet portion polarized in opposite directions to each other to interact with the first and second focus coil units, the second magnet portion partially surrounding the first magnet portion; and a third magnet portion and a fourth magnet portion polarized in opposite directions to each other to interact with the third and fourth focus coil units, the fourth magnet portion partially surrounding the third magnet portion.

23. The optical pickup actuator of claim 13, wherein a first focus coil and a second focus coil, of the at least two focus coils, have a same entire effective coil length, throughout the plurality of focus coil units.

24. The optical pickup actuator of claim 13, further comprising at least one track coil disposed to interact with the magnet and used for tracking driving.

25. An optical recording and/or reproducing apparatus comprising:

an optical pickup comprising an actuator driving an objective lens, the optical pickup moving in a radial direction of a medium and recording and/or reproducing information into and/or from the medium; and a control unit controlling a focus servo and a track servo of the optical pickup, wherein the actuator comprises:

a lens holder mounted with an objective lens;

a support member, with one end of the support member being fixed to a side of the lens holder and another end of the support member being fixed to a holder provided on one end portion of a base to enable the lens holder to move with respect to the base; and a pair of magnetic circuits disposed on opposite sides of the lens holder, wherein each of the magnetic circuits comprises:

a plurality of focus coil units; and a magnet comprising a plurality of magnet portions to interact with the plurality of focus coil units, each magnetic portion being polarized in a direction opposite to an adjacent magnet portions, of the plurality of magnet portions, wherein electromagnetic forces act on at least two focus coils, of at least one of the plurality of focus coil units, in respectively same directions in response to focus driving signals and in respectively opposite directions in response to tilt driving signals, wherein the at least two focus coils have different effective coil lengths, wherein each of the plurality of focus coil units comprise a first focus coil unit, comprising at least two focus coils, and a second focus coil unit, comprising at least two focus coils, and wherein a focus coil of the first focus coil unit, having a longer effective coil length than another focus coil of the first focus coil unit, is connected with a focus coil of the second focus coil unit, having a shorter effective coil length than another focus coil of the second focus coil unit.

26. The optical recording and/or reproducing apparatus of claim 25, wherein an effective overall coil length in the at least two focus coils of the first focus coil unit is the same as an effective overall coil length in the at least two focus coils of the second focus coil unit.

27. The optical recording and/or reproducing apparatus of claim 25, wherein an effective coil length of a first focus coil of the first focus coil unit is a same as an effective coil length of a second focus coil of the second focus coil unit, and an effective coil length of a second focus coil of the first focus coil unit is a same as an effective coil length of a first focus coil of the second focus coil unit.

28. The optical recording and/or reproducing apparatus of claim 25, wherein the plurality of magnet portions comprise at least four magnet portions, comprising:

a first magnet portion and a second magnet portion polarized in opposite directions to interact with the first focus coil unit; and a third magnet portion and a fourth magnet portion polarized in opposite directions to interact with the second focus coil unit.

29. The optical recording and/or reproducing apparatus of claim 25, wherein the plurality of magnet portions comprise at least four magnet portions, comprising:

a first magnet portion and a second magnet portion polarized in opposite directions to interact with the first focus coil unit; and a third magnet portion and a fourth magnet portion polarized in opposite directions to interact with the second focus coil unit.

30. The optical recording and/or reproducing apparatus of claim 25, wherein the plurality of focus coil units further comprise:

a first focus coil unit and a second focus coil unit disposed in a focus direction; and a third focus coil unit and a fourth focus coil unit disposed in the focus direction and separated from the first and second focus coil units in a tracking direction.

31. The optical recording and/or reproducing apparatus of claim 30, wherein a focus coil of the first focus coil unit, having a longer effective coil length than another focus coil of the first focus coil unit, is connected with a focus coil of the second focus coil unit, having a longer effective coil length than another focus coil of the second focus coil unit, and the other focus coil of the first focus coil unit, is connected with the other focus coil of the second coil unit, and wherein a focus coil of the third focus coil unit, having a longer effective coil length than another focus coil of the third focus coil unit, is connected with a focus coil of the fourth coil unit, having a longer effective coil length than another focus coil of the fourth focus coil unit, and the other focus coil of the third of the third focus coil unit is connected with the other focus coil of the fourth focus coil unit.

wherein the focus coil of the first focus coil unit is connected with the other focus coil of the third focus coil unit and the other focus coil unit of the second focus coil unit is connected with the focus coil of the fourth focus coil unit.

32. The optical recording and/or reproducing apparatus of claim 31, wherein the focus coil of the first focus coil unit is connected with the other focus coil of the third focus coil unit and the other focus coil unit of the second focus coil unit is connected with the focus coil of the fourth focus coil unit.

33. The optical recording and/or reproducing apparatus of claim 31, wherein the plurality of magnet portions comprise at least four magnet portions, comprising:
   a first magnet portion and a second magnet portion polarized in opposite directions to interact with the first and second focus coil units, the second magnet portion partially surrounding the first magnet portion; and
   a third magnet portion and a fourth magnet portion polarized in opposite directions to interact with the third and fourth focus coil units, the fourth magnet portion partially surrounding the third magnet portion.

34. The optical recording and/or reproducing apparatus of claim 30, wherein the plurality of magnet portions comprise at least four magnet portions, comprising:
   a first magnet portion and a second magnet portion polarized in opposite directions to interact with the first and second focus coil units, the second magnet portion partially surrounding the first magnet portion; and
   a third magnet portion and a fourth magnet portion polarized in opposite directions to interact with the third and fourth focus coil units, the fourth magnet portion partially surrounding the third magnet portion.

35. The optical recording and/or reproducing apparatus of claim 25, wherein a first focus coil and a second focus coil, of the at least two focus coils, have a same entire effective coil length, throughout the plurality of focus coil units.

36. The optical recording and/or reproducing apparatus of claim 25, further comprising at least one track coil disposed to interact with the magnet and used for tracking driving.

37. A method of controlling a magnetic circuit, comprising:
   forcing a plurality of magnet portions of a magnet to interact with a plurality of focus coil units, each magnet portion being polarized in a direction opposite to an adjacent magnet portion, of the plurality of magnet portions,
   wherein electromagnetic forces act on at least two focus coils, of at least one of the plurality of focus coil units, in respectively same directions in response to focus driving signals and in respectively opposite directions in response to tilt driving signals,
   wherein the at least two focus coils have different effective coil lengths,
   wherein each of the plurality of focus coil units comprise a first focus coil unit, comprising at least two focus coils, and a second focus coil unit, comprising at least two focus coils, and
   wherein a focus coil of the first focus coil unit, having a longer effective coil length than another focus coil of the first focus coil unit, is connected with a focus coil of the second focus coil unit, having a shorter effective coil length than another focus coil of the second focus coil unit.

38. An optical pickup actuating method, comprising:
   moving a lens holder, mounted with an objective lens, with respect to a base, through a support member, with one end of the support member being fixed to a side of the lens holder and another end of the support member being fixed to a holder provided on one end portion of the base,
   wherein the moving of the lens holder is performed using a magnetic circuit controlled according to the method of claim 37.

39. An optical recording and/or reproducing method, comprising:
   driving an actuator, of an optical pickup, in a radial direction of a medium;
   a control unit controlling the driving of the actuator to control a focus, track, and/or tilt servo of the optical pickup; and
   recording and/or reproducing information into and/or from the medium,
   wherein the driving of the actuator is performed using a magnetic circuit controlled according to the method of claim 37.

* * * * *

UNITED STATES PATENT AND TRADEMARK OFFICE
CERTIFICATE OF CORRECTION

| | |
|---|---|
| PATENT NO. | : 7,631,322 B2 |
| APPLICATION NO. | : 11/043453 |
| DATED | : December 8, 2009 |
| INVENTOR(S) | : Hyung-joo Kang |

It is certified that error appears in the above-identified patent and that said Letters Patent is hereby corrected as shown below:

Column 21, Lines 6-7, Claim 6, change "a first focus coil unit and a second focus coil unit disposed in a focus direction; and" to --the first focus coil unit and the second focus coil unit disposed in a focus direction; and--.

Column 22, Lines 59-60, Claim 18, change "a first focus coil unit and a second focus coil unit disposed in a focus direction; and" to --the first focus coil unit and the second focus coil unit disposed in a focus direction; and--.

Column 24, Lines 55-56, Claim 30, change "a first focus coil unit and a second focus coil unit disposed in a focus direction; and" to --the first focus coil unit and the second focus coil unit disposed in a focus direction; and--.

Signed and Sealed this

Sixteenth Day of March, 2010

David J. Kappos
*Director of the United States Patent and Trademark Office*